United States Patent
Martineau

(10) Patent No.: US 11,862,021 B2
(45) Date of Patent: *Jan. 2, 2024

(54) METHOD AND APPARATUS FOR REMANENT IMAGING CONTROL

(71) Applicant: Martineau & Associates, Menlo Park, CA (US)

(72) Inventor: Pierre R. Martineau, Menlo Park, CA (US)

(73) Assignee: Martineau & Associates, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/664,641

(22) Filed: May 23, 2022

(65) Prior Publication Data
US 2022/0286609 A1    Sep. 8, 2022

Related U.S. Application Data

(63) Continuation of application No. 17/068,787, filed on Oct. 12, 2020, now Pat. No. 11,343,430, which is a
(Continued)

(51) Int. Cl.
G06T 7/20 (2017.01)
G08G 1/16 (2006.01)
H04N 5/14 (2006.01)
G06V 10/94 (2022.01)
G06V 10/44 (2022.01)
(Continued)

(52) U.S. Cl.
CPC ............... G08G 1/164 (2013.01); B60R 1/00 (2013.01); G06T 7/215 (2017.01); G06T 7/292 (2017.01); G06T 7/70 (2017.01); G06V 10/443 (2022.01); G06V 10/82 (2022.01); G06V 10/94 (2022.01); G06V 20/56 (2022.01); G08G 1/166 (2013.01); H04N 5/145 (2013.01); H04N 23/60 (2023.01); H04N 23/6811 (2023.01); H04N 23/73 (2023.01); B60R 2300/105 (2013.01); B60R 2300/303 (2013.01)

(58) Field of Classification Search
USPC ....... 358/1.1–3.29, 1.11–1.18; 382/100–325; 396/3, 7–24, 48–59, 153
See application file for complete search history.

(56) References Cited

U.S. PATENT DOCUMENTS 5,764,786 A    6/1998   Kuwashima et al.
5,784,115 A *  7/1998   Bozdagi ................ H04N 7/012
                                                         348/448
(Continued)

OTHER PUBLICATIONS

European Patent Application No. 16876824.0, Search Report dated Jul. 16, 2019.
(Continued)

*Primary Examiner* — Marcellus J Augustin
(74) *Attorney, Agent, or Firm* — Ahmann Kloke LLP

(57) ABSTRACT

The invention is drawn towards a method and apparatus for controlling a consumer based on motion detected in a data stream, comprising: receiving the data stream, extracting motion information from the image data, generating commands and parameters for the consumer according to the motion information and controlling the consumer according to the commands and parameters.

20 Claims, 28 Drawing Sheets

Related U.S. Application Data continuation of application No. 16/063,555, filed as application No. PCT/US2016/067303 on Dec. 16, 2016, now Pat. No. 10,805,538.

(60) Provisional application No. 62/268,000, filed on Dec. 16, 2015.

(51) Int. Cl.

| | |
|---|---|
| *G06V 20/56* | (2022.01) |
| *H04N 23/68* | (2023.01) |
| *H04N 23/60* | (2023.01) |
| *H04N 23/73* | (2023.01) |
| *G06V 10/82* | (2022.01) |
| *G06T 7/215* | (2017.01) |
| *G06T 7/292* | (2017.01) |
| *G06T 7/70* | (2017.01) |
| *B60R 1/00* | (2022.01) |

(56) References Cited

U.S. PATENT DOCUMENTS

| | | | |
|---|---|---|---|
| 5,974,235 A | 10/1999 | Nunally et al. | |
| 5,984,475 A | 11/1999 | Galiana et al. | |
| 7,636,486 B2 | 12/2009 | Steinberg et al. | |
| 8,948,482 B2 | 2/2015 | Levin | |
| 9,723,204 B2* | 8/2017 | Wilensky | H04N 23/80 |
| 9,787,899 B1* | 10/2017 | Hinkel | H04N 5/23254 |
| 11,343,430 B2* | 5/2022 | Martineau | H04N 5/23254 |
| 2003/0053600 A1 | 3/2003 | Schmitz et al. | |
| 2005/0030315 A1* | 2/2005 | Cohen | G06T 11/60 |
| | | | 345/555 |
| 2007/0058073 A1* | 3/2007 | Steinberg | H04N 23/6811 |
| | | | 348/E5.046 |
| 2009/0219439 A1 | 9/2009 | Sellers et al. | |
| 2009/0221374 A1 | 9/2009 | Yen et al. | |
| 2009/0256921 A1 | 10/2009 | Pertsel et al. | |
| 2010/0271484 A1 | 10/2010 | Fishwick et al. | |
| 2011/0193989 A1 | 8/2011 | Steinberg et al. | |
| 2011/0205255 A1 | 8/2011 | Matsuura et al. | |
| 2011/0205355 A1 | 8/2011 | Liu et al. | |
| 2011/0285855 A1 | 11/2011 | Ota | |
| 2012/0086822 A1 | 4/2012 | Ishii et al. | |
| 2012/0154272 A1 | 6/2012 | Hildreth | |
| 2014/0064555 A1* | 3/2014 | Sebastian | G06T 5/003 |
| | | | 382/103 |
| 2014/0118486 A1 | 5/2014 | Luo et al. | |
| 2015/0103190 A1 | 4/2015 | Corcoran et al. | |
| 2015/0287214 A1 | 10/2015 | O'Gorman et al. | |
| 2016/0086050 A1 | 3/2016 | Piekniewski et al. | |
| 2016/0191802 A1* | 6/2016 | Martinello | H04N 5/232 |
| | | | 348/208.4 |
| 2017/0067739 A1* | 3/2017 | Siercks | H04N 5/23293 |
| 2017/0172406 A1 | 6/2017 | Pamplona et al. | |

OTHER PUBLICATIONS

International Application No. PCT/US2016/067303, International Search Report and Written Opinion dated Apr. 17, 2017.

* cited by examiner

450 - RESOLUTION 256x256x64

IMAGE SEQUENCE

PIXELS WITH CROSSWISE MAXIMUM PROPERTY

451 - RESOLUTION 64x64x8

IMAGE SEQUENCE

PIXELS WITH CROSSWISE MAXIMUM PROPERTY

452 - RESOLUTION 32x32x8

IMAGE SEQUENCE

PIXELS WITH CROSSWISE MAXIMUM PROPERTY

453 - RESOLUTION 64x64x4

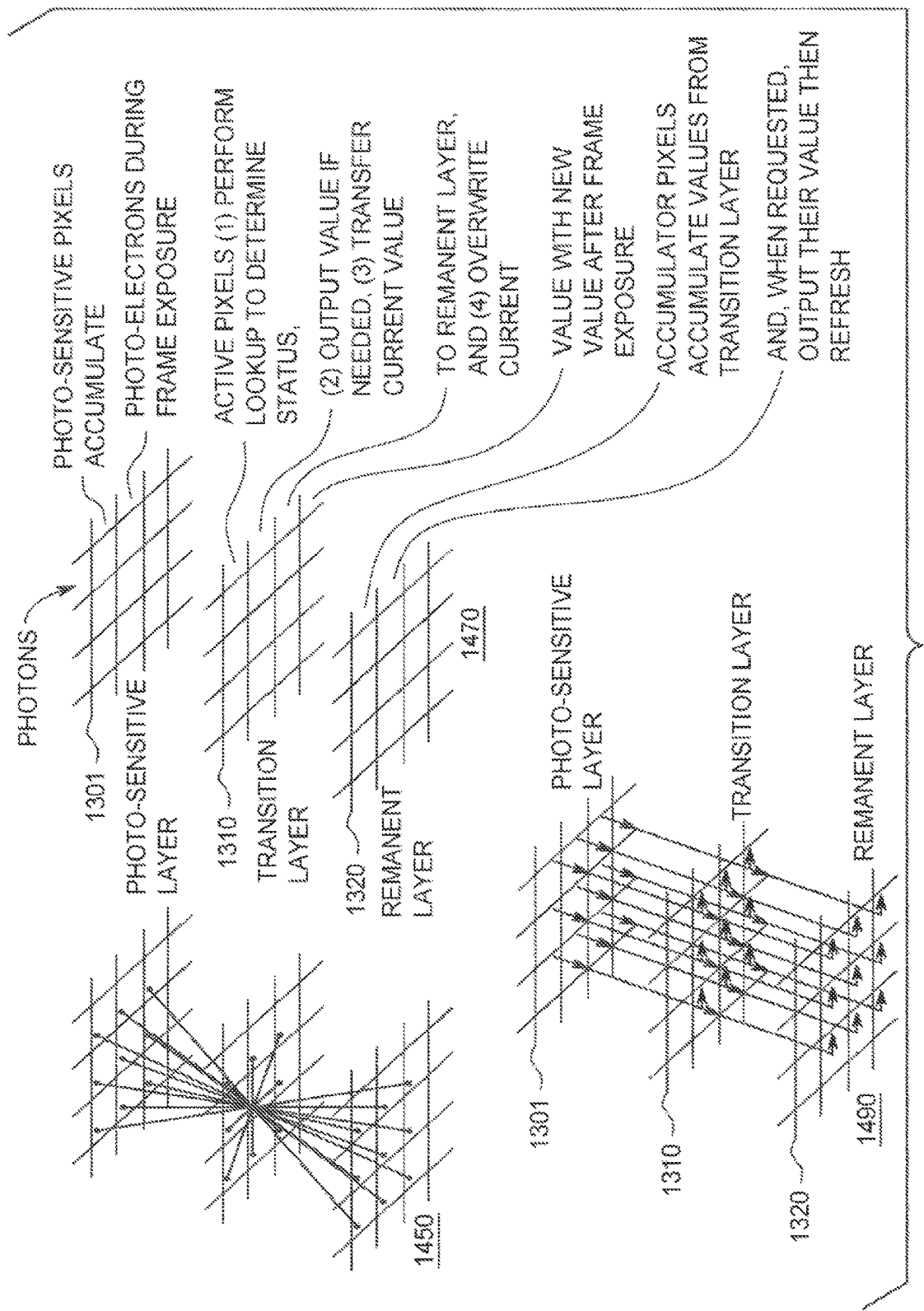

METHOD AND APPARATUS FOR REMANENT IMAGING CONTROL

CROSS-REFERENCE TO RELATED APPLICATIONS

This application is a continuation of U.S. application Ser. No. 17/068,787, filed Oct. 12, 2020, entitled "METHOD AND APPARATUS FOR REMANENT IMAGING CONTROL," which is a continuation of U.S. application Ser. No. 16/063,555, filed on Jun. 18, 2018 and entitled "METHOD AND APPARATUS FOR REMANENT IMAGING CONTROL", issued as U.S. Pat. No. 10,805,538, which is a 35 U.S.C. § 371 of International Application No. PCT/US2016/067303, filed on Dec. 16, 2016 entitled "METHOD AND APPARATUS FOR REMANENT IMAGING CONTROL" which claims priority to U.S. Provisional Patent Application No. 62/268,000, filed on Dec. 16, 2015 and entitled "METHOD AND APPARATUS FOR REMANENT IMAGING CONTROL", all of which are incorporated in their entireties herein by reference.

FIELD

The present disclosure relates to camera imaging systems and more specifically to methods and devices for recording video images and analyzing, extracting, or measuring motion information from such images.

DESCRIPTION OF RELATED ART

Processing of motion-related data in video images is a very active field with many kinds of apparatuses and processes used in an ever growing range of applications. Despite their diversity, all of the current technology shares the basic assumption that video is interpreted as sequences of time samples: video input are sequences of snapshot images captured at successive time intervals, each snapshot containing information about a scene at the specific point in time at which it was captured—what some may refer to as "Snapshot Imaging".

As a consequence of this paradigm, the technology is not capable of processing motion from single images in a given sequence without any context or reference to other images in the sequence. In particular, a problem exists with the current state of the art that it is not possible to output motion measures from a single image. Instead, motion processing requires an image sequence with multiple images and computation of data from multiple images in the sequence. Another problem to be solved is that the quality of motion data directly depends on the sharpness of object features in individual images, thus current motion tracking systems are not very robust when sharpness, frame rates, exposure times and the like are degraded. Finally, with such constrained motion and object tracking, it is difficult to use this motion information to control upstream or downstream devices, or to control other software components.

Therefore, the present invention is directed to methods and apparatuses which are robust to the aforementioned parameters and can take advantage of the motion data to provide improved control of devices.

SUMMARY

An embodiment of the present invention is drawn to a method for remanent imaging control comprising capturing remanent images via a capture device, extracting motion from the remanent images and controlling one or more devices according to the motion extracted from the remanent images by generating parameters and commands to control the one or more devices based on the motion.

Another embodiment of the present invention is drawn to an apparatus for remanent imaging control comprising an imaging capture device coupled to a remanent imaging processor comprising memory and one or more processors, wherein the memory includes thereon computer executable instructions executable by the one or more processors that when executed perform a method comprising capturing remanent images via a capture device, extracting motion from the remanent images and controlling one or more devices according to the motion extracted from the remanent images by generating parameters and commands to control the one or more devices based on the motion.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 14C is an illustration of light hitting the sensor chip illustrated in FIG. 14A in accordance with exemplary embodiments of the present invention;

Figure 1A:
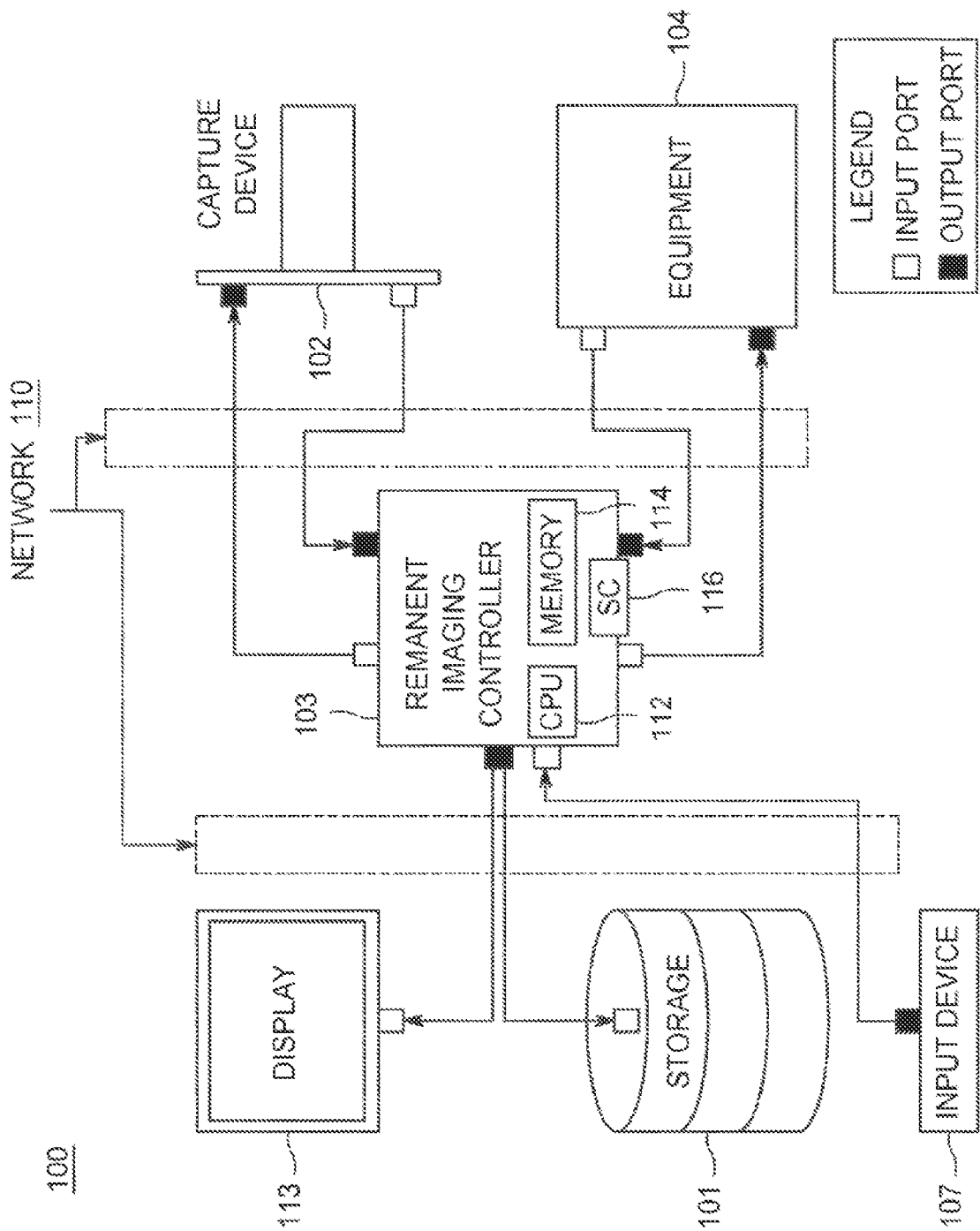
FIG. 1A is a block diagram of a remanent imaging control apparatus according to embodiments of the present invention.

While the components and systems are described herein by way of example for several embodiments and illustrative drawings, it should be understood that the drawings and detailed description thereto are not intended to limit embodiments to the particular form disclosed. Rather, the intention is to cover all modifications, equivalents and alternatives falling within the spirit and scope of the components and systems defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but are not limited thereto

DETAILED DESCRIPTION OF THE INVENTION

The following detailed description refers to the accompanying drawings. While several illustrative embodiments are described herein, many modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments.

According to exemplary embodiments, the present invention provides a process control method ("Remanent Imaging Control"). In certain embodiments, remanent imaging control is used to control equipment and/or software based on data captured by one or more image capture devices. One or more images are generally captured via the one or more capture devices using, in some instances, specific frame rate-dependent exposure settings, though in some embodiments the image capture device is integrated in the controller itself. These images are then subject by a remanent imaging controller apparatus to many processing operations so that motion information relevant to the particular control task can be extracted. This motion information may include velocity, direction, orientation, and acceleration information of scene objects, background objects, or the capture devices themselves, as the case may be. The apparatus uses this extracted information to generate control commands and parameters to control the operation of the equipment, the capture devices, or as feedback to the apparatus itself.

In many circumstances remanent images are produced with exposure times that result in motion blur. In snapshot imaging, by contrast, exposure time is generally short enough to prevent such blur, the maximum duration of the exposure time being determined by the speed of the fastest moving objects in the scene. Remanent Images result from the mathematical integration of the luminous power irradiating the sensor plane during the exposure interval. As the power irradiating the source originates from the power radiated by scene components, an image can also be interpreted as the projection on the sensor plane of the power radiated by scene components integrated over the exposure interval. As scene components move during the exposure time along the field lines of their velocity fields, images can also be interpreted as the projection of the velocity field resulting from integrating a time-varying velocity field over the exposure interval. Consistent with this interpretation, motion data can be extracted, not by the usual numerical processing performed on sequence of snapshots, but by morphological algorithms and other algorithms capable of handling abstract mathematical objects; this type of processing is often referred to as symbolic processing. Remanent imaging algorithms are fundamentally different from all other motion extraction algorithm used in Snapshot Imaging as they work on a single image at a time; such image can be a native output of a camera, or synthetically created by processing an image sequence. By nature, no sampling-based motion extraction algorithm can infer motion from a single time sample.

Those of ordinary skill in the art will recognize that the single image from which motion information is extracted can be a single frame from a video capture device, or an image aggregating multiple images by summation or maximization.

It should be understood that, notwithstanding the fundamental difference between remanent images and snapshot images, computations involving sequential differences and dynamic considerations are not precluded in the Remanent Imaging Control processing chain, and that hybrid configurations in which snapshot images are captured or generated along with remanent images are possible.

It should be further understood that remanent imaging control can also be used in hybrid implementations together with other prior art methods. While remanent imaging is used mostly in the context of video image sequences, a single snapshot can be viewed as a remanent image sequence containing a single image; in the same vein, sequences of isolated snapshots can be viewed as a plurality of remanent image sequences, each sequence having a single image. Therefore, some embodiments may use snapshot imaging to capture crisp images occasionally as part of an overall process driven by the processes and apparatuses defined in the present invention.

FIG. 1A is a block diagram of a remanent imaging control apparatus 100 according to embodiments of the present invention.

The remanent imaging control apparatus (RICA) 100 comprises a capture device 102, a remanent imaging controller 103 and optional peripheral devices such as storage 101, input device 107 and display 113. The equipment 104 is a target device to be controlled by the RICA 100.

The capture device 102 is an imaging sensor which captures one or more images of a scene in remanent imaging mode in the form of a data stream (an image stream, a pixel stream, byte stream or the like). In some instances, there are one or more imaging sensors, for example RI capture device 102. The capture device 102 is coupled to the remanent imaging controller (RIC) 103. The RIC 103 receives the data stream captured by all coupled sensors, extracts motion information from the data stream, stores and retrieves data via the storage 101. The storage 101 may store the remanent images, information extracted from the remanent images, other data generated by the capture device 102 and the equipment 104 and other intermediary data created and/or used by the RIC 103. The RIC 103 may access the storage 101 and the optional display 113 via a network 110 or directly. In certain embodiments, the RIC 103 is embodied as a physical chip with one or more CPUs 112, memory 114 and support circuits 116, where the imaging capture device 102, and the equipment 104 communicate with the RIC 103 directly, or over a network 110.

Figure 1B:
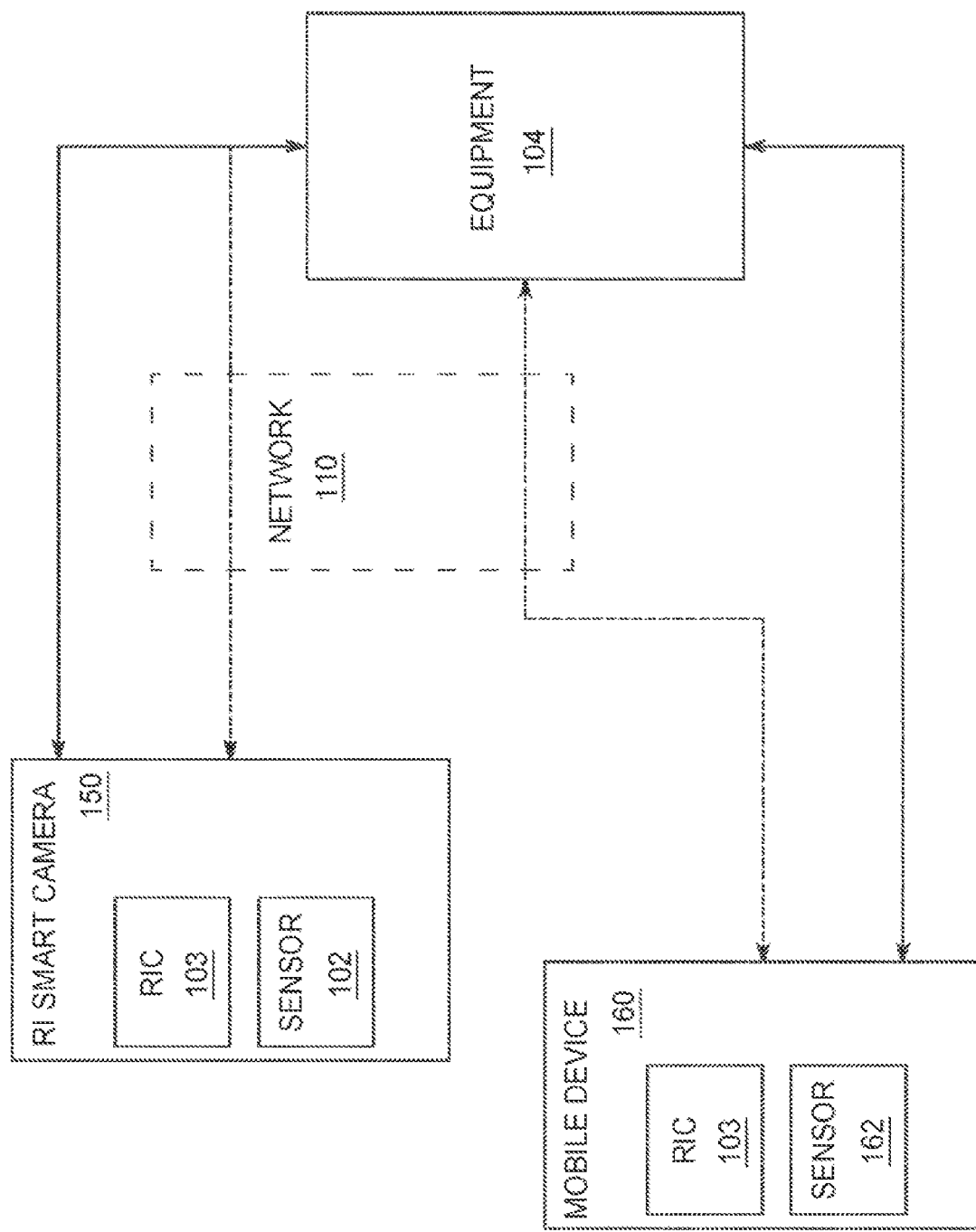
FIG. 1B is a block diagram of embodiments of an RI smart camera and a mobile device for remanent imaging control in accordance to embodiments of the present invention.

In other embodiments, the RIC 103 is embodied as an embedded processing board and co-located with the imaging capture device 102 as RI smart camera 150 shown in FIG. 1B within the same physical device, or within the same physical chip as the sensors coupled to equipment 104 via a network 110, wired or wirelessly. In another embodiment illustrated in FIG. 1B, a mobile device 160 may contain the RIC 103 as a set of software instructions executable by the processor of the mobile device 160, also coupled with the imaging sensor 162 in the same physical device, coupled to equipment 104 via a network 110, wired or wirelessly.

In various embodiments, the CPU 112 of RIC 103 is one or several CPUs, GPUs, FPGAs, VLSI or smart sensor chips. The methods and operations performed by the RIC 103 may be performed sequentially, or in parallel depending on the task and thus takes advantage of CPU architectures which facilitate parallel processing. Those of ordinary skill in the art will recognize that the memory of RIC 103 comprises non-transitory computer readable media and may be implemented using any suitable memory technology, such as static random access memory (SRAM), synchronous dynamic RAM (SDRAM), nonvolatile/Flash-type memory, or any other type of memory. The memory of RIC 103 may store program instructions, image data or the like.

The RIC 103 receives sensor data from imaging capture device 102. In some instances, the sensor data is stored on storage 101, while in other instances the sensor data may be held in memory 114 of the RIC 103, though the two storages are not mutually exclusive. The data received from imaging capture device 102 is in some embodiments a stream of gray-level images recorded sequentially by the capture device 102. In many embodiments, the capture device 102 captures one or more images at a constant frame rate and with the longest exposure time that the capture device 102 can sustain at that frame rate. For example, if the capture device 102 is recording at 3.75 fps, that exposure time might be 266 ms. The constraint on exposure time is chosen so that the resulting image stream approximates remanent imaging and can be treated as such by subsequent controllers and methods described herein.

The sensor data is then analyzed by various processes on the RIC 103 to extract motion information. This motion information is used to generate control commands and control parameters. In some instances, these control commands and control parameters control the imaging capture device 102. In other instances, these commands and parameters are used to control equipment 104, such as automotive vehicles, autonomous vehicles, drones, robots, conveyor belts, quality inspectors, plants, flow regulators and testors (via particle image velocimetry), irrigation systems, tracking systems, surveillance systems, cameras, displays. In some instances, the motion information is fed back to the RIC 103 in order to enhance the operation of the RIC 103, to enhance the extraction of motion information from subsequent sensor data, or a combination of both. Some examples of equipment and control information are illustrated in FIGS. 13-20.

The process of extracting motion information from sensor data received from the imaging capture device 102 is robust to blurring, frame-rate changes, speed, and the like. Therefore, precise control of equipment 104 can be performed even in unfavorable conditions in which sampling based methods are no longer usable.

Figure 2:
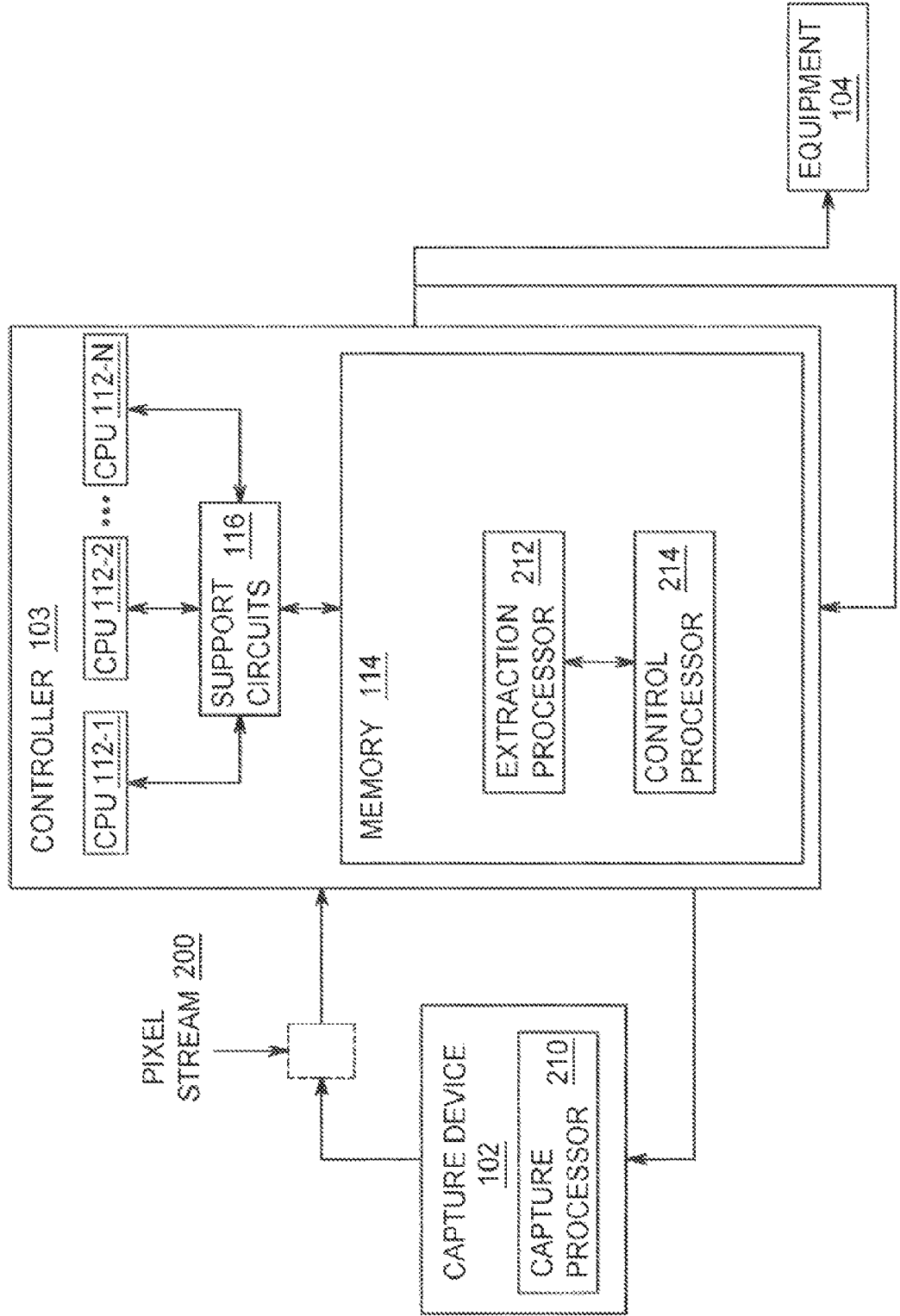
FIG. 2 is block diagram of the remanent imaging controller of the remanent imaging control apparatus according to embodiments of the present invention.

FIG. 2 is a block diagram of the remanent imaging controller (RIC) 103 of the RICA 100 according to embodiments of the present invention. As shown in FIG. 1, the RIC 103 comprises CPU 112, which is in some embodiments, a collection of one or more CPUS 112-1, 112-2 to 112-N, support circuits 116 and memory 114.

Memory 114 comprises a capture processor 210, an extraction processor 212 and a control processor 214. Those of ordinary skill in the art will recognize that the capture processor 210, the extraction processor 212 and the control processor 214 are illustrated as individual software modules comprising program instructions executable by the one or more CPUs 112 that perform various methods, but that in some instances each of the software modules may be contained on a different memory, a different device/chip, or embodied as a service whose output is received over a network such as network 110. In some embodiments, the capture processor 210 refers to a logical block that includes the capture controls of capture device 102.

The present invention does not prescribe that the capture processor 210, the extraction processor 212 and the control processor 214 always be collocated on physical memory, nor that the functions contained within each software module as described in the present invention are only contained within those software modules. In yet other embodiments, the capture processor 210, the extraction processor 212 and the control processor 214 may be self-contained on their own chips coupled to separate CPUs and support circuits.

The RIC 103 receives a pixel stream 200 (i.e., a data stream) from the imaging capture device 102 in, according to one embodiment, one or more image frames.

In some embodiments, the capture device 102 comprises a capture processor 210. The capture processor 210 represents a logical block that receives a stream of commands as input to control capture of the one or more images. The capture processor 210 may stack the one or more images and may store them in memory or in an external storage such as storage 101. The capture processor 210 provides the pixel stream 200 to the extraction processor 212. The extraction processor 212 extracts information from the pixel stream 200 and provides this information to the control processor 214. The control processor 214 generates commands and parameters with which the RIC 103 controls equipment 104 and/or imaging capture device 102, in addition to using the parameters as feedback to the operation of the capture processor 210 and the extraction processor 212.

Figure 3A:
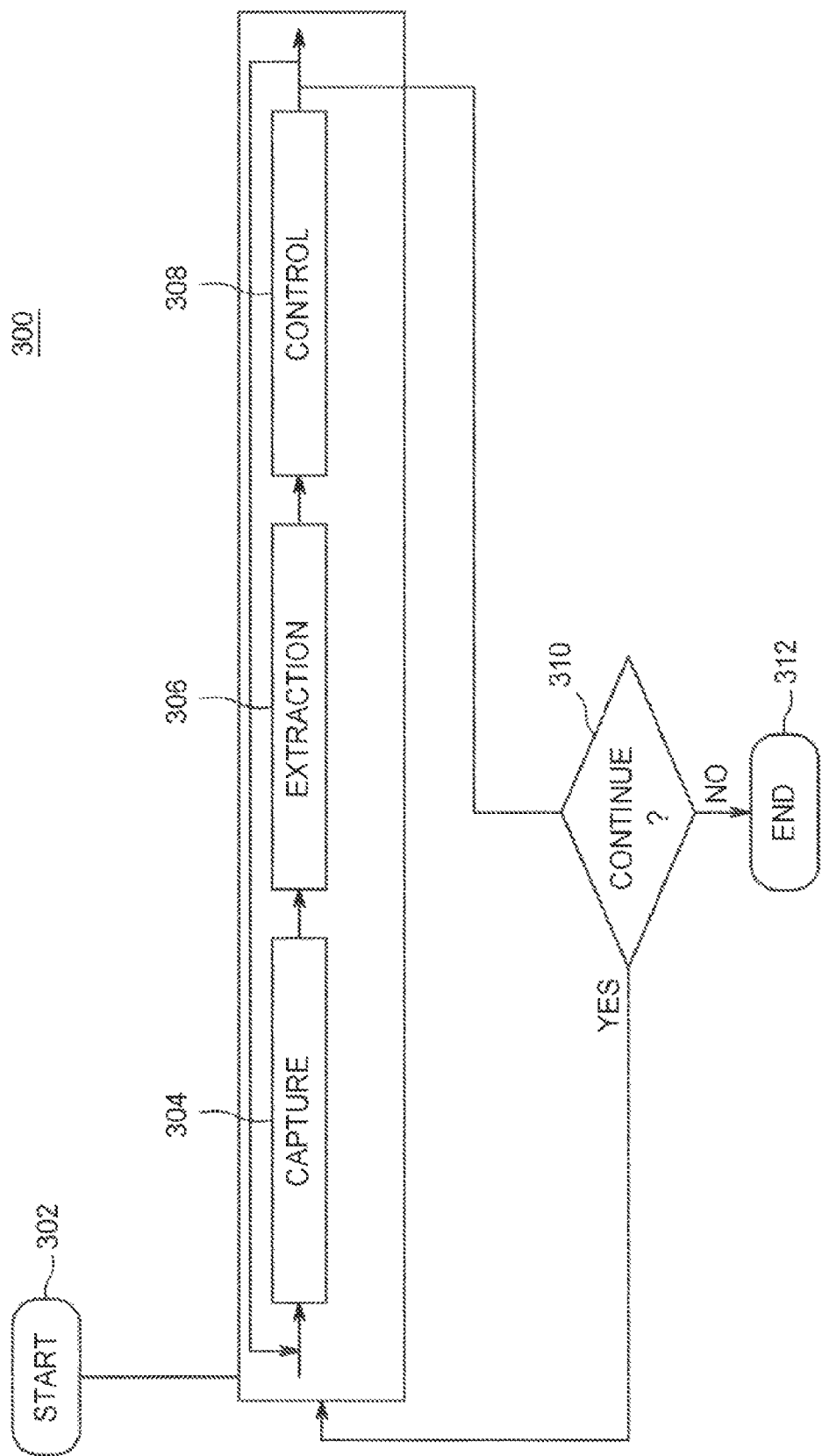
FIG. 3A is a flow diagram illustrating a method for performing remanent imaging control in accordance with embodiments of the present invention.

FIG. 3A is a flow diagram illustrating a method 300 for performing remanent imaging control in accordance with embodiments of the present invention. The RIC 103 represents a particular implementation of the method 300, where the method 300 is a set of program instructions that are executed by one or more CPUs 112. Some portions of the method 300 are not necessarily executed sequentially.

Method 300 begins at step 302 and then proceeds to step 304.

At capture processing 304, the RIC 103 signals an imaging sensor, e.g., imaging capture device 102, to start recording a remanent imaging sequence and produce a pixel stream 200. According to embodiments of the present invention, a remanent imaging sequence consists of a sequence of photographs of a given scene captured with an exposure time equal to the inverse of the capture frequency in order to preserve continuity of the irradiated power over time. Thus the capture step 304 can request that the capture processor 210 invoke a specialized remanent imaging sensor system, or one or more ordinary imaging sensors.

At capture processing 304, the RIC 103 can interface with off-the-shelf video capture devices whose recording parameters have been adjusted so that they approximate remanent imaging to perform capture. For a given frame rate, this can be achieved by setting the sensor exposure time to the longest value consistent with the frame rate and keeping this exposure value constant during the entire recording. For example, when recording at 30 fps, each image in a remanent imaging sequence should be exposed at ⅟30 s. In practice, the sensor of a video capture device needs some time to refresh between each exposure. For a given video capture device, the remanent exposure of that capture device at a given frame rate is defined as the longest exposure time that the capture device can support at that frame rate and produce a new image at each frame cycle; a capture device capturing at "remanent exposure" is said to operate in Remanent Imaging mode. For a capture device supporting four frame rates ranging from 3.75 fps to 30 fps, typical examples of remanent imaging exposures might be 0.266 sat 3.75 fps, 0.133 sat 7.5 fps, 0.066 sat 15 fps, and 0.033 sat 30 fps.

In some embodiments, properly rounded integer multiples of the remanent exposure can be used to approximate remanent imaging at a lower frame rate than the capture frame rate or at frame rates not natively supported by the capture device, in order to reduce the amount of unexposed, inter-frame time for example. For a sensor capturing at 60 fps for example, exposure durations of 0.066 s and 0.099 s could be used instead of the 0.016 s remanent exposure at 60 fps, though the present invention does not limit this. At 60 fps, using an exposure time of 0.016 s would result in 0.04 s left unexposed every second, while using 0.066 s (the remanent exposure at 30 fps) or 0.099 s (the remanent exposure at 20 fps) would leave unexposed only 0.02 s every second. Therefore, it should be understood that the operating frame rate of a capture device constrains, but does not fully dictate, the usable exposure time. This is useful in remanent adaptive exposure, discussed further below.

While many embodiments may perform the capture function using a single off-the-shelf video camera, some embodiments may use ad hoc systems comprising a variety of custom or off-the-shelf components such as sensors, board-level or embedded cameras, camera systems, ASICs, FPGAs, CPUs, GPUs, and computer systems.

According to some embodiments, sensor refresh time is neglected and the sum of all images in a remanent imaging sequence, in the absence of dynamic range, pixel depth, sensor saturation, or integer overflow considerations, is identical to the single remanent image that would have been captured by the sensor exposed continuously over the time interval spanned by the sequence. In many situations, taking the maximum instead of the sum of a sequence of frames, either on board the camera as framed are captured by the sensor or downstream as frames are received from stream 200, yields equivalent results and sometimes better performance of the apparatus 100. In what follows, we will refer to an image produced by either summing or maximizing a remanent image sequence as an image produced by "Stacking" that remanent image sequence, or as a "stacked image", "image stack", or "stack" for short. Many of the processing steps discussed with regard to the extraction processor 212 produce the same result whether performed on individual images before summation or maximization then summing or maximizing the individual results, or performed on the stacked image. These processing steps can be referred to as "Commutable Steps".

"Atomic remanent images" refer to images that are either the raw output of the capture step 304 or the results of applying or the result of applying Commutable Steps to that output. Thus, "remanent images" may refer to either atomic remanent images, or images that result from stacking a sequence of atomic remanent images originating from capture device 102 and spanning consecutive time intervals.

A remanent image sequence can be represented computationally by three dimensional matrices where the matrix element at position (l, j, k) represents the energy accumulated by the pixel of imaging capture device 102 at position (l, j) during the $k^{th}$ exposure. Such energy is computed as a volume integral (triple integral) of the irradiated power falling on the surface of the pixel (l, j) during exposure k. The method 300 views each of these three dimensions as interchangeable as can be seen when the volume integral of a function is computed using a tessellation of the integration domain. Such tessellation can be created from virtual cuboid pixels formed by the actual sensor pixels along the 2 planar dimensions and the time segment of the exposure interval along the time dimension. The result would form a tessellation of the area-duration volume defined by the sensor rectangle and the sequence duration. Binning pixels spatially and lengthening the exposure time yields a rougher tessellation; using a shorter exposure time and a higher sensor spatial resolution (i.e., smaller sensor pixels in higher count) yields a finer tessellation.

Figure 3B:
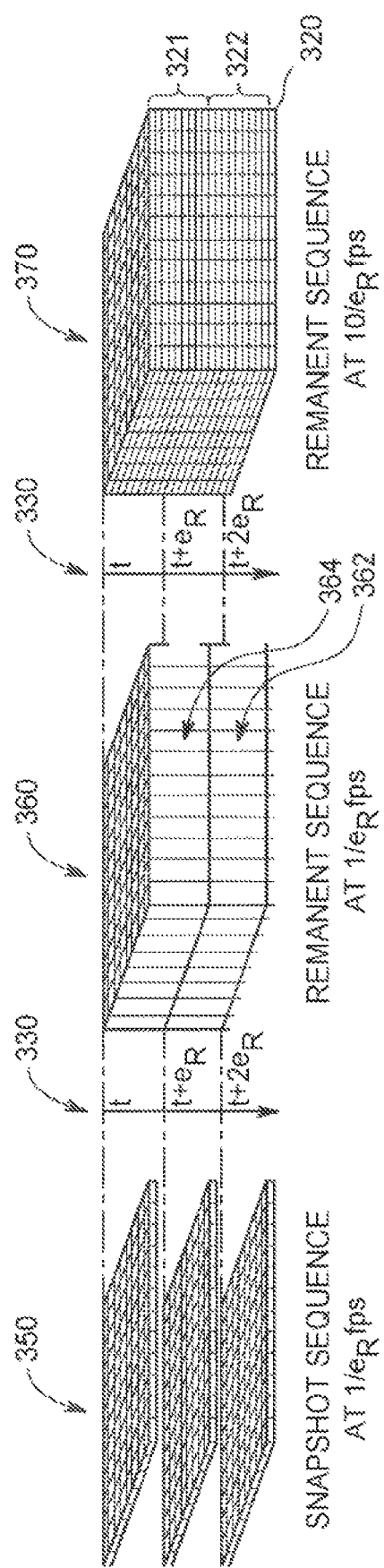
FIG. 3B is an illustration of various methods for capturing an image sequence in accordance with embodiments of the present invention.

FIG. 3B, a diagrammatic view comparing three methods of capturing sequences of images, illustrates these tessellations. Each of the three columns in FIG. 3B shows a sequence of images depicted vertically along the vertical time axis 330 pointing downward. Each of the sequence of images (or alternatively, tessellations) 350, 360 and 370 are assumed to be recording the same scene with identical capture devices using identical parameters, except for the exposure time and frame rate, as discussed below.

The sequence 350 depicts the standard "snapshot" video recording method. Here, the three snapshots "layers" were captured at time t, t+$e_R$, and t+$2e_R$, respectively, where $e_R$ is the inverse of the frame rate used to capture the sequence. Each snapshot is represented on FIG. 3B with a vertical thickness which represent the exposure time used to capture it; according to the scale defined by the time axis 330, exposure time of the snapshots layers is $e_R/10$.

The sequence 360 depicts frames being captured at the remanent imaging mode of a capture device at the same frame rate. In remanent imaging mode, the exposure time is imposed by the frame rate, and is therefore $e_R$. Only the two frames 362 and 364 were captured during the time interval [t, t+$2e_R$]. As suggested by the protruding lines at the base of 362, the capture of a third frame was initiated at t+$2e_R$ but is not complete yet.

The sequence 370 contains 21 frames captured in Remanent Imaging mode at $10/e_R$ fps, a frame rate ten times larger than that of the left and middle columns. It should be noted that the first, eleventh, and twenty-first images in the sequence 370 are identical to the three snapshots in sequence 350, respectively, since they were recorded using the exact same parameters. The sequences 360 and 370 form compact tessellations of the volume they span, but the snapshots in sequence 350 do not: large voids are left between each snapshot.

Based on such conceptualizations, the 3d image matrix of a remanent sequence can be considered from all three orthogonal directions in a meaningful and homogeneous manner. In particular, as new Remanent Images can be produced by stacking remanent image sequences—achieved computationally by summing or maximizing their 3 d matrices along the time dimension—meaningful images can also be obtained computationally by summing or maximizing such matrices along the other dimensions. These stacks will be discussed further with respect to some of the embodiments described in FIGS. 15-19.

As a result, remanent images meant to be processed as single images may be represented by matrices with one more dimension than their snapshot imaging equivalent. For example, while a 3-dimensional matrix may be adequate to represent a single color snapshot, a 4-dimensional matrix may be needed to represent a single color remanent image. To maintain the generality of this disclosure, the output of the capture step 304 consists in a stream of data that contains multidimensional matrices representing remanent images and structured objects representing commands or attributes. Similarly, the extraction step 306 and the control step 308 comprise similar data. In many embodiments, the output of each step of method 300 may be implemented over TCP streams via a data protocol to transmit multidimensional matrices as binary data and structured objects in JSON format, though the method 300 is not limited thereto.

As mentioned earlier, color and multi-channel images and images represented by higher dimensional matrices can be handled in many ways by remanent imaging control. Some ways consist of reducing matrices to single-channel gray level matrices via pre-processing performed by the preprocessor 400 of the extraction processor 212, or treating each elementary two dimensional matrices in the higher dimensional matrix as a separate stream of images, as if coming from separate capture devices.

At extraction processing 306 (which may or may not proceed sequentially after step 304), the extraction processor 212 performs one or several of the following steps: performing preprocessing operations such as image dilation, blurring and the like (discussed in further detail below) within the pixel stream 200, performing extraction of a motion map, and performing motion measurement. The extraction performed by the extraction processor 212 is described in further detail with respect to FIGS. 4-5, 9-12.

At command processing 308, the control processor 214 generates commands and parameters as discussed further below with respect to FIGS. 6 and 15-20 based on the motion information and sends these commands and parameters to the equipment 104, the capture processor 210, or the extraction processor 212. According to some embodiments, the control processor 214 outputs three streams at step 308 to be transmitted via hardwired connections, dedicated protocols, or wireless networks to its target consumers. For example, the control block may have a direct connection to a camera through which recording parameters such as exposure, gain, or iris values are sent. Generally speaking the target consumers will be (1) equipment(s) to control, (2) image recording devices, and (3) other RIC processing blocks. The control processor 214 controls the parameters of the capture block so that images produced in the stream meet remanent imaging requirements and produce usable images (e.g., images that are not saturated or underexposed) by methods described in the present invention.

For example, many cameras provide automatic exposure control mechanisms that were not designed for remanent imaging; in remanent imaging mode, such mechanisms must typically be disabled to fix the exposure value, resulting in other recording parameters such as iris or gain no longer controlled by the camera. Left uncontrolled, these parameters may produce underexposed or saturated images. In one embodiment, adequate control of the capture device is implemented by measuring predetermined image areas via integration of gray-level values to assess illumination levels and correct iris or gain values accordingly. In some embodiments, the control block may implement the remanent adaptive region of interest (ROI) extraction capabilities described later in this disclosure to adapt the area being measured, or the frequency at which the measure computation (the measuring processor 406 shown in FIG. 4A) is performed, to variations in scene content and illumination.

The commands and parameters generated by the RIC 103 may in some instances comprise image and command data that controls capture processing 304 occurring in the capture processor 210, and other equipment 104. If at step 310, there is more data in the pixel stream 200 to be continue, the method 300 proceeds to step 304 again, otherwise the method ends at step 312.

In many embodiments, the main goal of the control step 308 is to maintain an object of interest in the stream 200 in some kind of homeostasis, and the degree of success is measured by the absence of global motion of that object of interest.

For illustrative purposes, the functions of the RIC 103 are separated out into these processing blocks 304, 306 and 308. However in some instances, these steps are carried out in parallel, and may distribute output to each or all steps.

The field of process control in general is fertile in potential applications of machine learning techniques. In particular, process control applications rely on feedback loops, and these loops offer natural insertion points for machine learning algorithms; in some cases, entire process control systems can be implemented via machine learning.

Remanent imaging control expands the perimeter in which machine learning can be applied to process control situations by including the capture device in such perimeter; it moves the relevance of machine learning upstream in the imaging stream and provides opportunities for deeper integration of the image capture process into the machine learning process flow.

Machine learning is of particular interest to remanent imaging control for several reasons. There are often different options for implementing a particular treatment in the method 300, and machine learning can be one such option. In some cases, embodiments of the present invention may be used together with other systems in situations requiring complex, difficult to write programs in which machine learning techniques may be preferred to explicit algorithms.

Finally, in some cases, machine learning is used to develop and fine tune, via simulation, part of the computer executable program instructions driving a capture device, those instructions being eventually implemented as firmware in the device. In some embodiments, the remanent imaging control apparatus 100 sensor devices, hardware components, or the entire system may be driven or implemented by synthetic programs generated via machine learning.

For example, convolutional neural networks (CNNs) are often used in machine learning-based imaging applications. In these, the processing flow typically involves feature extraction via successive hidden layers of processing treatments that apply banks of linear filters to, then down-sample, their input images. In the RIC 103, processing with banks of filters and down-sampling are typical steps that happen commonly in the extraction processor 212 (specifically, the preprocessor 400 and the motion processor 402). Hybrid CNN and remanent imaging control approaches can be leveraged in which the RIC 103 bypasses the input layers of a CNN and provides Motion Map-based input directly to one of its hidden layer, or in which a machine learning based algorithm replaces an explicit algorithm for motion extraction purpose.

Many RIC embodiments leverage the "process before record" method, a core method established by the present invention. This method provides a process by which image processing can be performed on a frame and produce output usable for control purposes even before that frame is fully captured. In some embodiments, "before that frame is fully captured" means also "before that frame leaves the camera", while in other embodiments, the frame capture is, in effect, finalized outside the camera body. How such early processing can be made possible on a regular CCD or CMOS-based camera is illustrated on FIG. 3B.

FIG. 3B, described earlier, is a schematic view of three sequences of images recorded with different methods, Snapshot Imaging at $1/e_R$ fps for the sequence 350, Remanent Imaging at $1/e_R$ fps for sequence 360, and Remanent Imaging at $10/e_R$ fps for sequence 370. Since the sensor refresh time can be neglected, images 364 and 362 in the remanent sequence 360 are identical to the images produced by adding the ten frames in each groups 321 and 322. The "Processing Before Recording" capability exploits this property.

For example, if the RIC 103 is capturing a sequence of Remanent Images at $1/e_R$ fps. FIG. 3B illustrates two methods of doing this. The first method is to actually record images at $1/e_R$ fps, as in sequence 360. The second is to record intermediate images at $10/e_R$ fps, as in sequence 370, add these intermediate images in groups of ten, and output the result. In turn, several options exist to implement this second method. According to one method, intermediate pixel values can be added in a buffer array as they are produced by the sensor, then the buffer content is output and refreshed every 10 frames. Or, intermediate images are stored by sequentially overwriting a ten-slot ring buffer and, every tenth frames, the 10 ring buffer slots are added and the result is output. Depending on the type of capture device used, the various options could be implemented entirely on board the camera, entirely outside the camera on specialized or general purpose hardware, or a combination of both. Regardless of the option, the intermediate pixels offer an opportunity to do image processing before the actual image is produced, and it is that opportunity that the "process before record" method leverages.

Figure 4A:
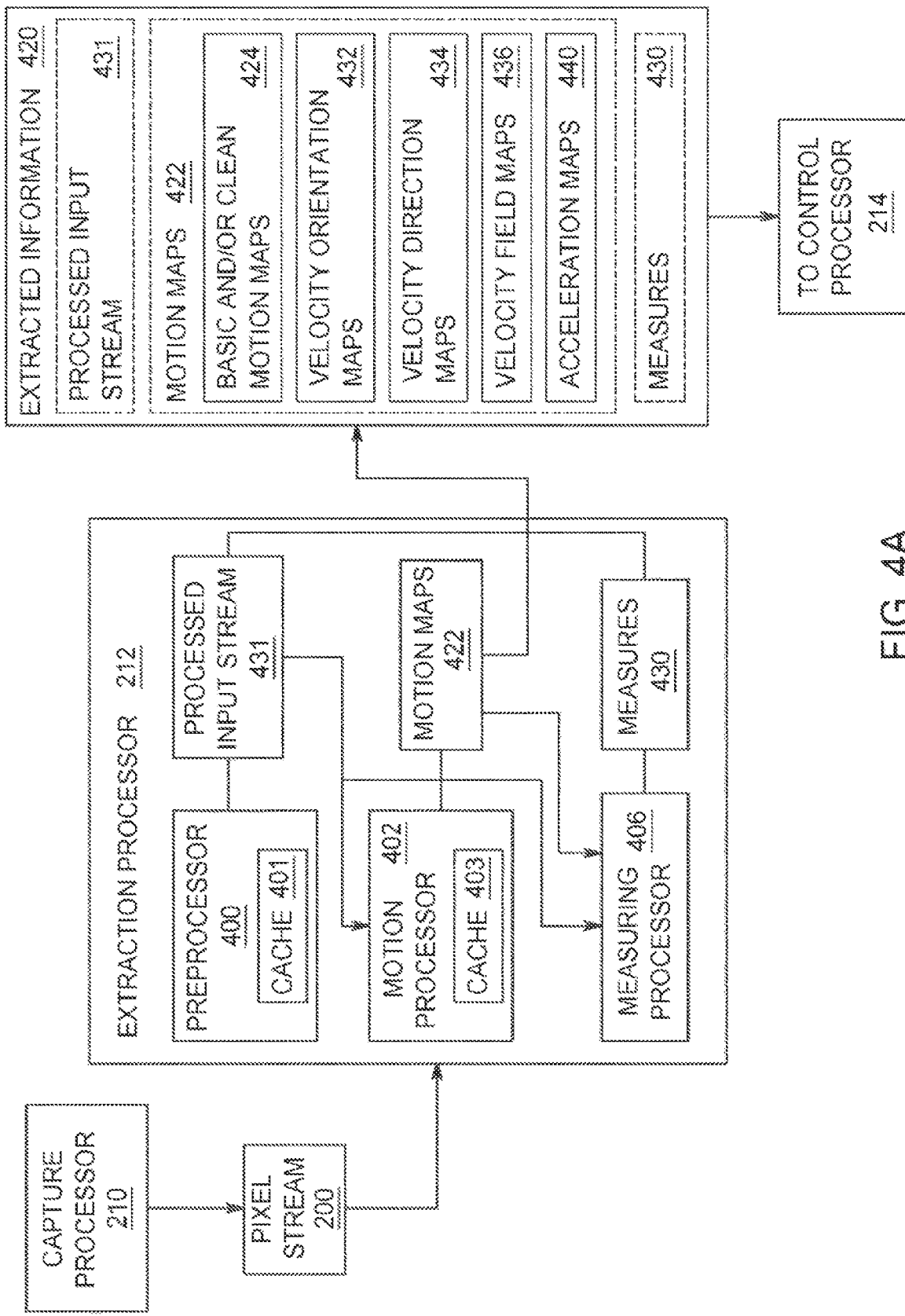
FIG. 4A is a block diagram of the extraction processor of the remanent imaging controller in accordance with exemplary embodiments of the present invention.

FIG. 4A illustrates a block diagram of the extraction processor 212 of the remanent imaging controller 103 in accordance with exemplary embodiments of the present invention.

The extraction processor 212 comprises a preprocessor 400 with a ring buffer cache 401, a motion processor 402 with cache 403, and a measuring processor 406. At a high level, the extraction processor 212 receives pixel stream 200 from the capture processor 210.

The extraction processor 212 may preprocess the input pixel stream using preprocessor 400 to generate a preprocessed input stream 431, may generate extracted information 420 via the motion processor 402, and may generate measures 430 via the measurement processor 406. It is important to recognize that while preprocessing, motion extraction and motion measurement are each optional, at least one of the three is required.

The extraction processor 212 may map motion via the motion processor 402 and may generate kinematic measures using the measuring processor 406. The extraction processor 212 generates the extracted information 420, which may comprise motion maps 422 generated by the motion processor 402. According to some embodiments, the kinematic measures comprise one or more of trajectory lengths, magnitudes of velocity or acceleration vectors, momentum, volumetric flux, or the like.

The basic or clean motion maps are synthetic images containing a super-set of all object trajectories extracted from the pixel stream 200. Referring to the velocity field interpretation introduced in paragraph 0038, motion maps contain the projections of a subset of field lines from such velocity field. According to some embodiments, the motion maps 422 may contain basic motion maps, clean motions maps 424, velocity orientation maps 432, velocity direction maps 434, velocity field maps 436, and acceleration maps 440.

Clean motion maps 424 are motion maps that contain the trajectory of objects of interests and these objects only, and with trajectories reduced to their medial axis (skeletonized) with no extraneous pixels. Clean motion maps are computed from basic motion maps by the Motion Map cleaning & cache update processing block (item 1164 in FIG. 10); as a result of this processing, the basic motion map input is overwritten by the clean motion map output. There is a multitude of ways in which such clean maps can be generated, depending on the application. In some embodiments, the clean motion maps 424 are produced natively by computing the motion map from consecutive image differences and applying morphological skeletonization algorithms to the result. In other embodiments, the generation of clean motion maps 424 utilizes specialized processing to remove background or irrelevant objects or compensate for camera motion. In some embodiments, clean motion map computations involve continuity considerations with the clean motion map value computed on a previous image in the input stream 200 and stored in data cache 403; in some instances, the motion processor copies the output of the clean motion map computation to the current map.

An example of native clean motion map generation is provided with an embodiment which may be used to monitor all moving objects, including planets, meteoroids, satellites, and airplanes, in a clear night sky. Such an embodiment may consist of a single, fixed capture device pointing skyward, with a lens of a focal length matching the solid angle of interest and focused to infinity, and imaging at approximately 3.75 frames per second with a 266 ms exposure time. Images may be streamed to a computer that extract a motion map from the difference of consecutive images using the algorithm described in FIGS. 11 and 12. The resulting motion map can be further thinned via mathematical morphology by using a skeletonization transform. The resulting motion map is natively "clean" as it only contains trajectories of moving brilliant objects of interest.

The motion processor 402 also extracts velocity maps 430. Velocity maps provide additional information on the field lines contained in motion maps. Velocity orientation maps 432 are a type of velocity map that contain the angular value of the tangent along the field lines represented the motion map. In some embodiments, these are extracted by way of line segment filtering on the basic or clean motion map 424. Such filtering can be done by correlating the basic or clean motion map 424 with a set of small thumbnails containing line segments with evenly distributed angular orientations. In some embodiments, these thumbnails are generated by RIC 103 and assembled as a three-dimensional matrix or multi-channel image. In such an orientation map, the orientation is typically known modulo Tr. Further refinements may produce velocity direction maps 434 in which the orientation is determined modulo 2n, and/or velocity field maps 436, in which the velocity vector is determined in direction and magnitude.

When the motion processor 402 generates velocity maps 430, in some embodiments the extracted information 420 may be represented as a multi-channel image with the first channel containing basic motion maps, and additional channels containing the velocity maps 430. Another channel is dedicated to velocity orientation maps 432, while velocity direction maps 434 require one or two channels of data depending on whether signed numbers are used in the image coding scheme of the motion processor 402. The velocity field maps 436 require at least two channels. The extracted information 420 generated by the extraction processor 212 may contain preprocessed input stream 431 generated by the preprocessor 400, motion maps 422 generated by the motion processor 402, and measures 430 generated by the measuring processor 406, but contains at least one of these.

In embodiments where storage or bandwidth may be limited, the process format of motion maps 422 are considered for performance improvement. In particular, in embodiments where the various processors of the RIC method are implemented on different hardware components, it may be advantageous to compute Motion Maps refinements downstream from the motion processor. For example if an embodiment implements Extraction processing and Control processing on different hardware components and the processing requires a full Velocity Field Map, then in this embodiment, the velocity field map may be computed as part of the Control processor 214.

Figure 4C:
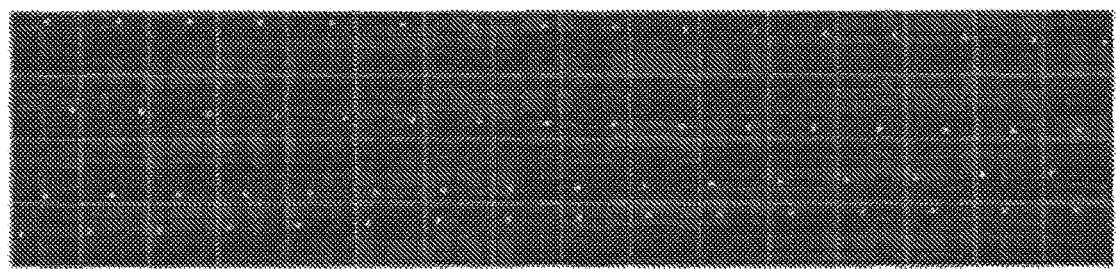
FIG. 4C illustrates the extraction of motion maps at various spatio-temporal resolutions in accordance with exemplary embodiments of the present invention.
Figure 4C:
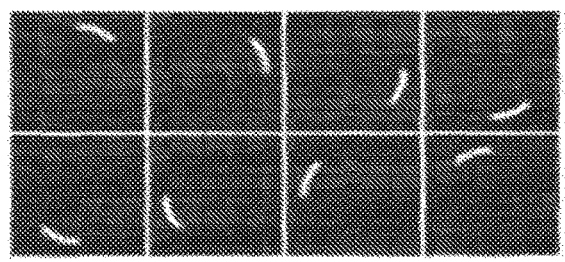
Figure 4C:
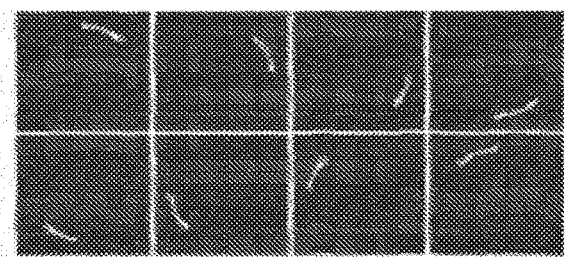
Figure 4C:
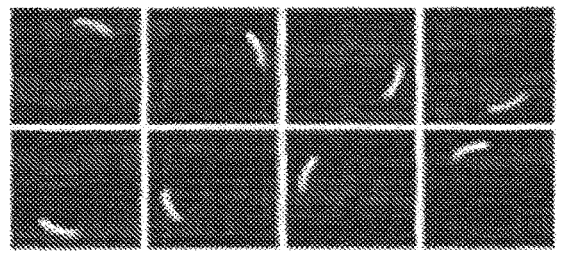
Figure 4C:
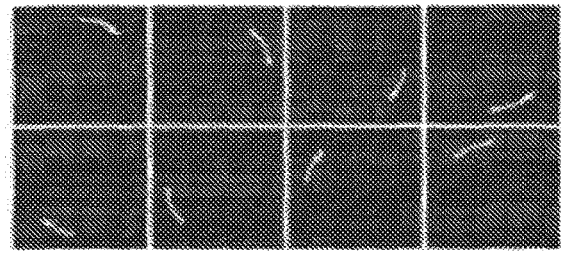
Figure 4C:
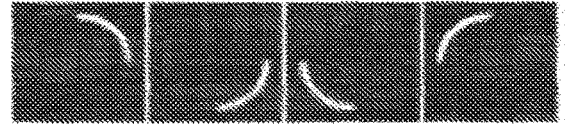
Figure 4C:
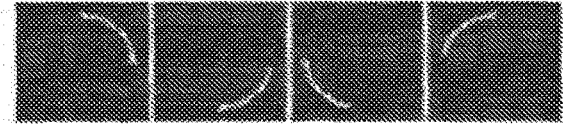

FIG. 4C shows examples of the algorithm applied to synthetic image sequences capturing a brilliant point moving along a circle of diameter 0.75 unit during 1 unit of recording time. Noting the spatio temporal resolution as l×m×n, with l, m, and n the number of samples per units of width, length, and time, sequence 450 is recorded at 256× 256×64 resolution. Sequences 451, 452, and 453 show sequences recorded at 64×64×8, 32×32×8, and 64×64×4 resolution, respectively and the sequences made of corresponding logical images showing pixels with Maximum Crosswise property (discussed further below) are also shown. This illustrates the robustness of the Maximum Crosswise property with respect to spatio-temporal resolution.

Figure 4E:
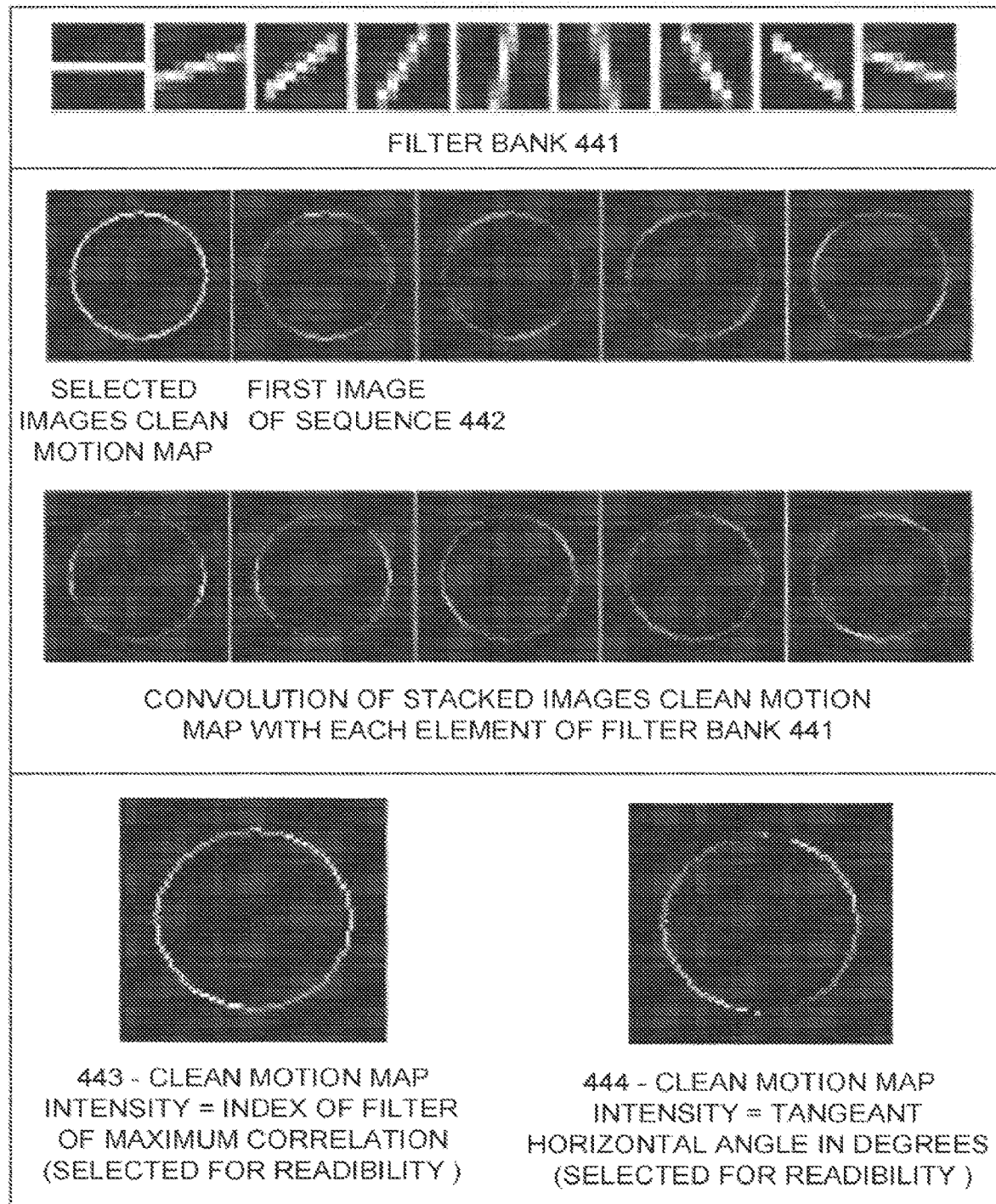
FIG. 4E is a diagrammatic representation of a simple Velocity Orientation Map extraction algorithm.

FIG. 4E is a diagrammatic representation of a simple Velocity Orientation Map extraction algorithm and its application to the sequence 451 in FIG. 4C which captures the motion of the brilliant point at resolution 64×64×8. Filter bank 441 is built by rotating a small line segment around the center of a 9×9 window; 9 angular positions, ranging from 0 to $8\pi/9$ in $\pi/9$ increments, each contribute one element to the filter bank 441, as illustrated in FIG. 4E. Then, the clean motion map of the stacked sequence 451 (a single image produced by stacking the 451 sequence using the maximum operator) is convolved with each element of this filter, producing a sequence 442 of nine gray level images, each image in the sequence corresponding to a particular element in the filter bank. Image 443 is produced by taking, at each trajectory point, the sequence index of the image on which the correlation value at that point is maximal; non-trajectory points are set to zero. Image 444, the Velocity Orientation Map, is subsequently produced by replacing each index by the corresponding rounded angular value in degrees. It should be understood that Velocity Orientation Map values at non trajectory points have no velocity orientation meaning.

In many embodiments, Velocity Orientation Map extraction performance may be improved by keeping the angular resolution very low, so that the convolution window in filter bank 441 is very small and the overall bank size is small. Depending on actual scene dynamics and capture frame rate, it may also be advantageous to perform the computation on a reduced resolution Motion Map.

Figure 5:
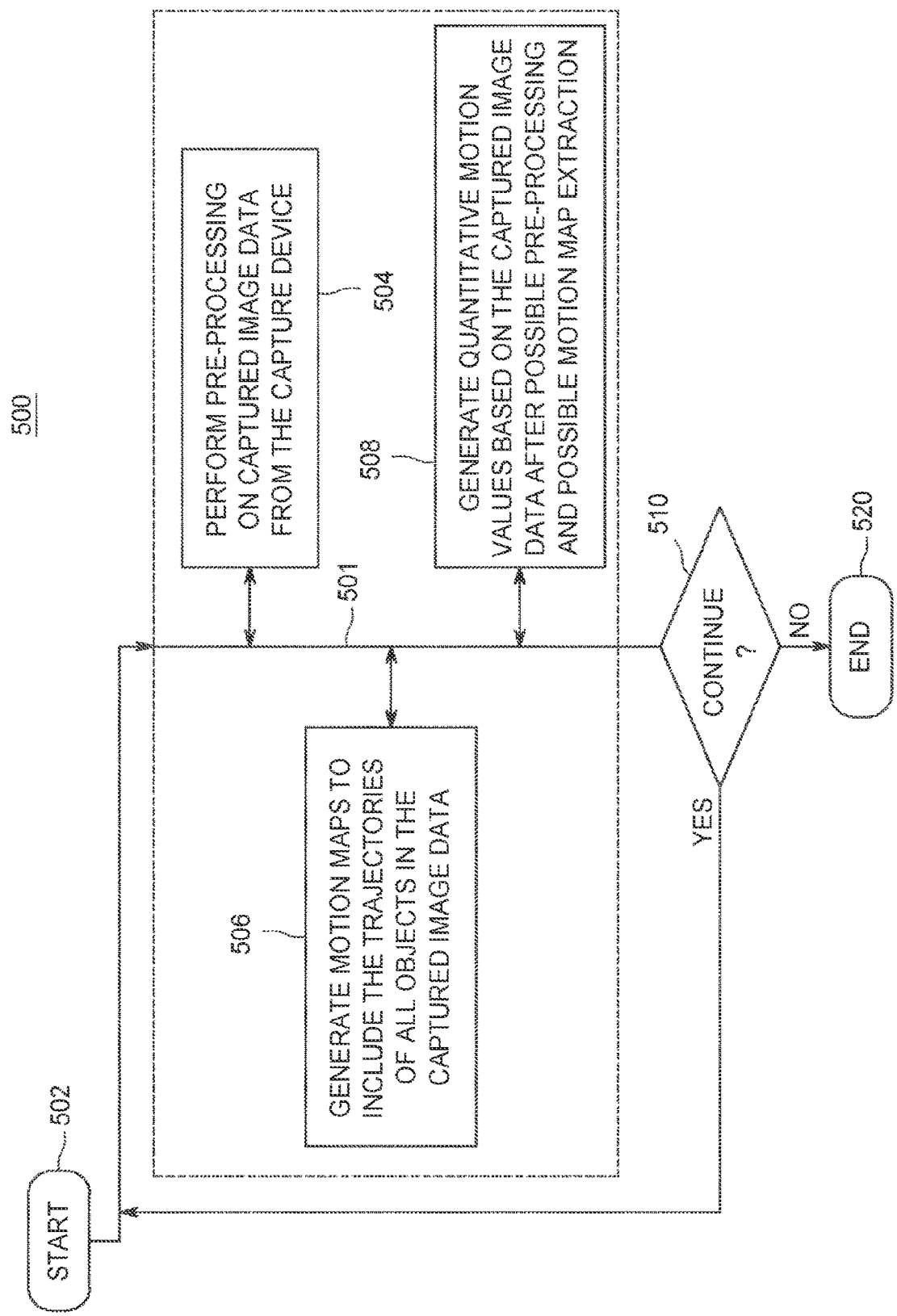
FIG. 5 is a flow diagram illustrating the method for extracting motion from the captured image data according to exemplary embodiments of the present invention.

FIG. 5 is a flow diagram illustrating the method 500 for extracting motion from the pixel stream 200 according to exemplary embodiments of the present invention.

The extraction processor 212 is an exemplary implementation of the method 500. The method 500 is a set of program instructions that are executed by one or more processors (e.g., CPU 112).

Though the method is shown as occurring sequentially, embodiments of the present invention allow for each of the steps to be performed in parallel or in other sequences than shown as indicated by the multi-directional arrow coupled to a logical "bus" 501. Method 500 begins at step 502 and then proceeds to step 504. Further, not all of the steps illustrated are mandatory.

At step 504, the extraction processor 212 invokes the preprocessor 400 to perform pre-processing on the stream 200 from the capture device; this step may modify the stream 200 and change it into preprocessed input stream 431.

Figure 10:
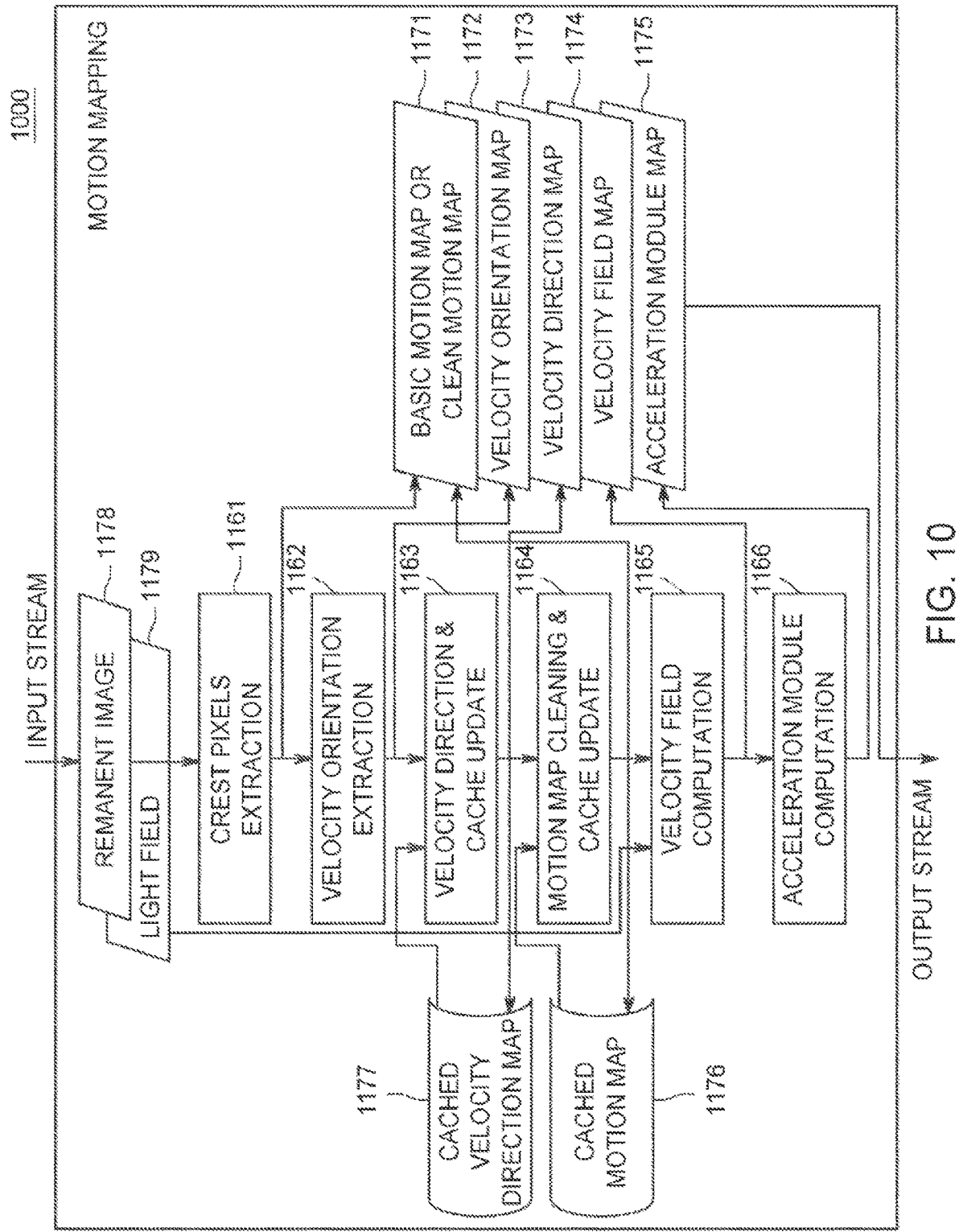
FIG. 10 is a flow diagram illustrating a method for generating motion maps in accordance with exemplary embodiments of the present invention.

At step 506, the motion processor 402 generates motion maps 422 from the objects in the stream 200, as described in further detail in FIG. 10.

At step 508, the motion processor 402 invokes the measuring processor 406 to extract kinematic information in the stream 200.

The motion measuring function can be performed at various points in the overall processing chain, depending on the application. In some cases, the availability of the Motion Maps 422 will be assumed, while in other cases Motion Maps 422 may not be necessary. The motion measuring function specifically pertains to the quantitative measure of distance, velocity, and acceleration; we will refer to these measures as kinematic measures of the zeroth, first, or second order, respectively.

In the prior art, such measures always require a plurality of images at some point in their computation. In the prior art, such measures are typically produced by computations on image sequences, either directly using matching points of interests in consecutive images, or using mathematical motion models processed computationally and updated as new images are captured. Difference-based techniques are often used; for example, velocity can be estimated from computing differences in position of particular objects between two consecutive images, and, similarly, acceleration can be estimated from computing the difference in the velocity of such objects between consecutive images.

Although it may be possible to use difference-based and other classical methods to compute motion data from Remanent Images—and such processing may take place in some embodiments—an entirely new family of measure extraction methods, unique to the present invention, is enabled by considerations on the nature of Remanent Images and the mathematical nature of measures as "fully additive set functions". These methods pertain to extracting measures from single Remanent Images and do not require a plurality of images. As discussed earlier, single Remanent Images may result from Stacking multiple consecutive Atomic Remanent Images, but this plurality is not required by the measure extraction method.

Many measures of interest "commute" with Stacking on most Remanent Image sequences: one such measure would produce the same result when extracted from a Remanent Image Stack or when computed from the sum of individual measures extracted from each Remanent Image in the sequence. With such measures, a wide spectrum of performance, data bandwidth, and quality trade-offs is possible; some embodiments may choose to perform precise measure involving complex computations at a fraction of the capture frequency by working on Image Stacks, while other embodiments may use very high capture frequency and compute simple measures at that frequency. In yet other embodiments, simple measures can be extracted at high frequency and corrected at reduced frequency by more precise measures.

For example, an embodiment may be used to monitor the activity of a group of objects by measuring the distance covered by this group of objects over time. Such embodiment may generate clean motion maps 424. An estimate of the distance covered by moving objects could be computed by adding up all non zero pixels of this motion map. Such computation could take place at a frequency matching the frame rate, or could be performed a fraction of the frame rate by accumulating motion maps (by computing the maximum of a sequence of motion maps), or by performing the computation on a motion map extracted from accumulated images. Finer estimates, obtained by extracting skeletonized versions of the motion map and discriminating pixels connected by their corners rather than their sides, may be generated from time to time and used to calibrate and/or correct the rougher estimates.

Possible motion measures differ not only in their kinematic order, but also with respect to the object to which they refer, which could be (1) a point or a set of points on the image, such as produced by stars in a night sky or specular reflections in a scene; (2) lines, such as produced by punctual objects moving in a scene, (3) image areas, which typically correspond to physical objects in a scene, or (4) to the entire image. Corresponding measures can be expressed mathematically as scalars, vectors, or vector fields and computationally as scalars, vectors, or multidimensional matrices. The distance example just discussed and illustrated in FIG. 4C is an example of a zero order, scalar measure. The Velocity Field Maps 436 and the Acceleration Maps 440 shown in FIG. 4 are examples of a first and second order measures generated by the measuring processor 406, respectively, expressed as vector fields.

In some embodiments, useful measures can be generated by even simpler methods that fully bypass the pre-processing and motion mapping blocks. In embodiments that monitor scenes in which the illumination conditions are well known, such as in the night sky example discussed earlier, or in which the illumination conditions are controlled, such as certain laboratory equipment, images do not need any special processing and can be measured directly for illumination level or entropy content. An extreme, yet practical, case is exemplified by merely saving images captured under such conditions in compressed format (PNG for example): the size of the generated file provides a reliable, usable motion measure.

It is important to realize that, in many embodiments, motion measures do not necessarily need to reflect any easy-to-grasp physical reality or make obvious physical sense to be useful, as long as they are derived from mathematically correct and consistent methods. In many embodiments, statistics may be performed on these measures in the processing pipeline (typically in the control processing step), treating them as probability measures. Therefore, measures generated by the motion measuring block can be computed by machine-synthesized algorithms using convergence criteria rooted in measure theory. As a consequence, in some embodiments of the present invention, the motion measuring step 508 is not made explicit a priori; instead, the motion processor is generated, by design, via machine learning. Consequently, the motion measuring step 508 provides a natural opportunity for inserting machine-synthesized code.

Measures on Remanent Image sequences exhibit commutative properties as long as they relate to actual meaningful sets compatible with Image Stacking operations. This can be determined by analyzing the nature of the objects being measured. For example, a camera operator might record a Remanent Image sequence of a group of insects flying in front of a background of vegetation with a hand held camera. As the group of insect moves, the operator may move to keep the best possible recording angle and illumination. The resulting images will contain kinematics data pertaining to the flight of the insects, the possible motion of the vegetation (if wind is present for example), and also may contain the motion of the camera. While the group of insect may be consistently recorded, the background composition may vary as the operator moves. In embodiments aiming at canceling the dominant motion of the camera or recording the group of insect at the best resolution (using functions later discussed in this disclosure), it will not be necessary to analyze the nature of the objects being recorded. However, for embodiments that try, in addition, to monitor the wind velocity across images, the background may be discriminated/distinguished and processed separately.

If there is further data to be processed, the method continues at step 510 to step 502, otherwise the method terminates at step 520.

Each of these steps is further described in detail in FIGS. 9-12 and the accompanying text below.

Figure 6:
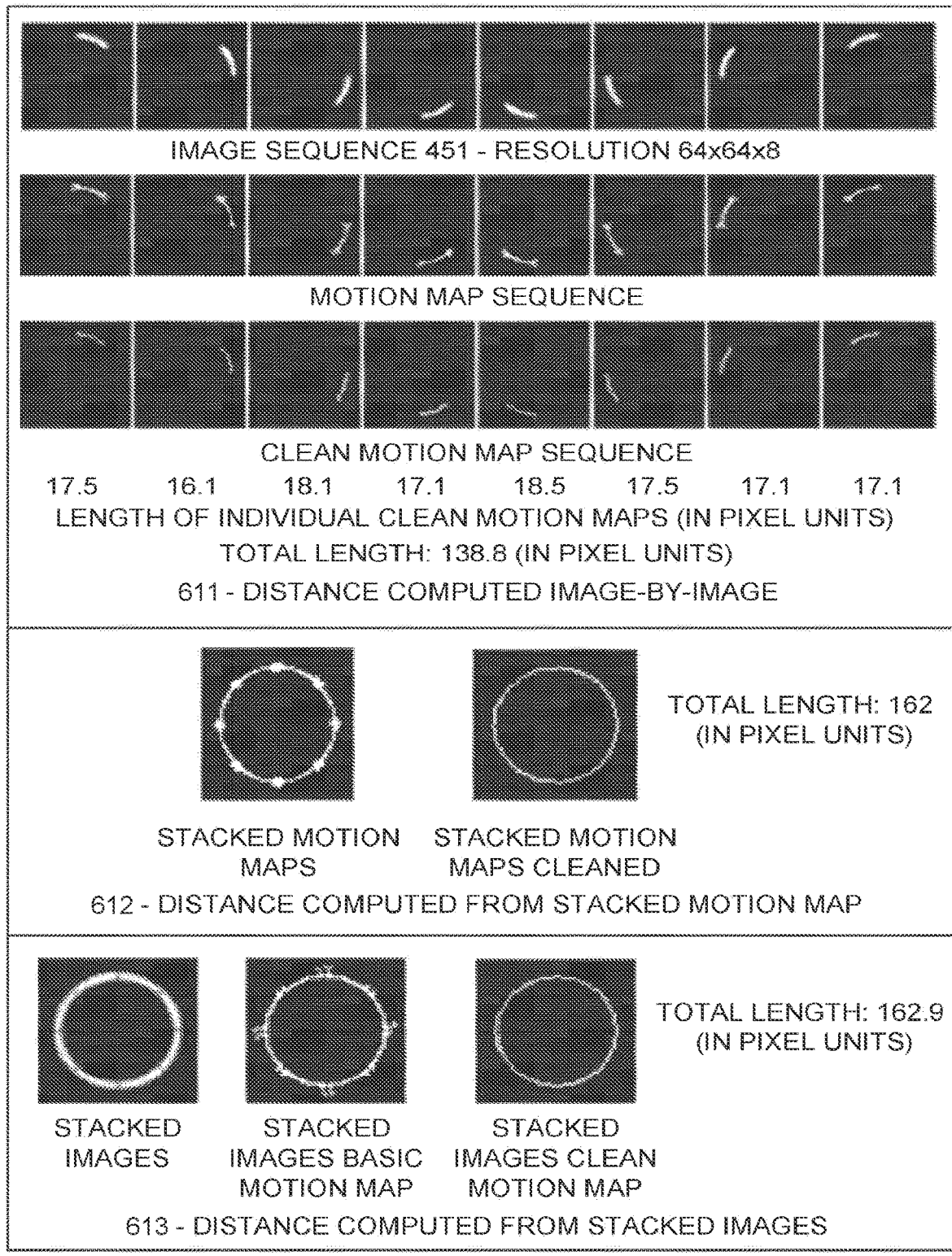
FIG. 6 is a flow diagram illustrating the commutative properties of the method for extracting motion measurements from the captured image data according to exemplary embodiments of the present invention.

FIG. 6 is a diagrammatic view of these commutative properties, applied to synthetic image sequence 451 of the rotating point in FIG. 4C using a simple measurement algorithm that computes distance from pixel connectivity, assigning the value 1 or √{square root over (2)} depending on whether pixels connect along their sides or corners. The actual computed length of the brilliant point circular trajectory is 150.8 pixel units. Sequence 611 shows the computation of the distance by extracting the distance on each individual image and summing, which yields 138.8 pixel units; sequence 612 shows the computation of the distance performed once on the stacked Motion Map resulting from the stacking of individual Motion Maps using the maximum operator, which yields 162 pixel units; sequence 613 shows the computation of the distance from the Motion Map extracted from the single image of sequence 451 stacked using the maximum operator, which yields 162.9.

Figure 7:
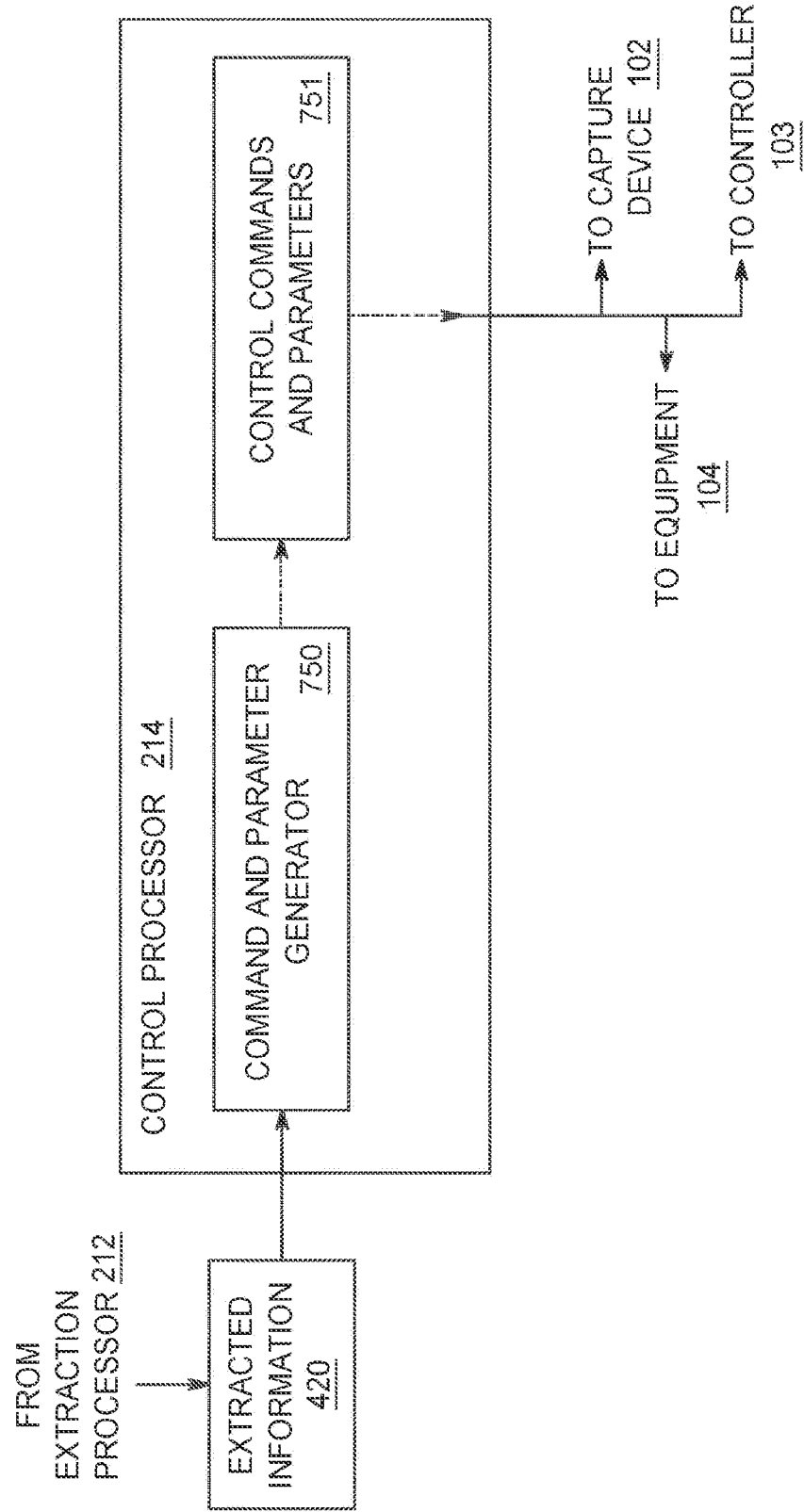
FIG. 7 is a block diagram of the control processor of the remanent imaging controller in accordance with exemplary embodiments of the present invention.

FIG. 7 is a block diagram of the control processor 214 of the remanent imaging controller 103 in accordance with exemplary embodiments of the present invention.

The control processor 214 comprises a command and parameter generator 750. The control processor 214 takes the extracted information 420 as input from the extraction processor 212 and outputs control commands and parameters 751 to the consumers, e.g., equipment 104, capture device 102 and the remanent imaging controller 103.

Using the extracted information 420 (e.g. motion information from the pixel stream 200), the control processor 214 invokes the command and parameter generator 750 to generate control commands and parameters 751.

Once the control commands and parameters 751 are determined, the control processor 214 outputs them to equipment 104, capture device 102 and/or the controller 103. In certain embodiments, the consumers of the control data may be located across a network such as network 110 or may be coupled directly to the remanent imaging controller 103 via the control processor 214 as illustrated in FIGS. 1A and 1B.

Figure 8:
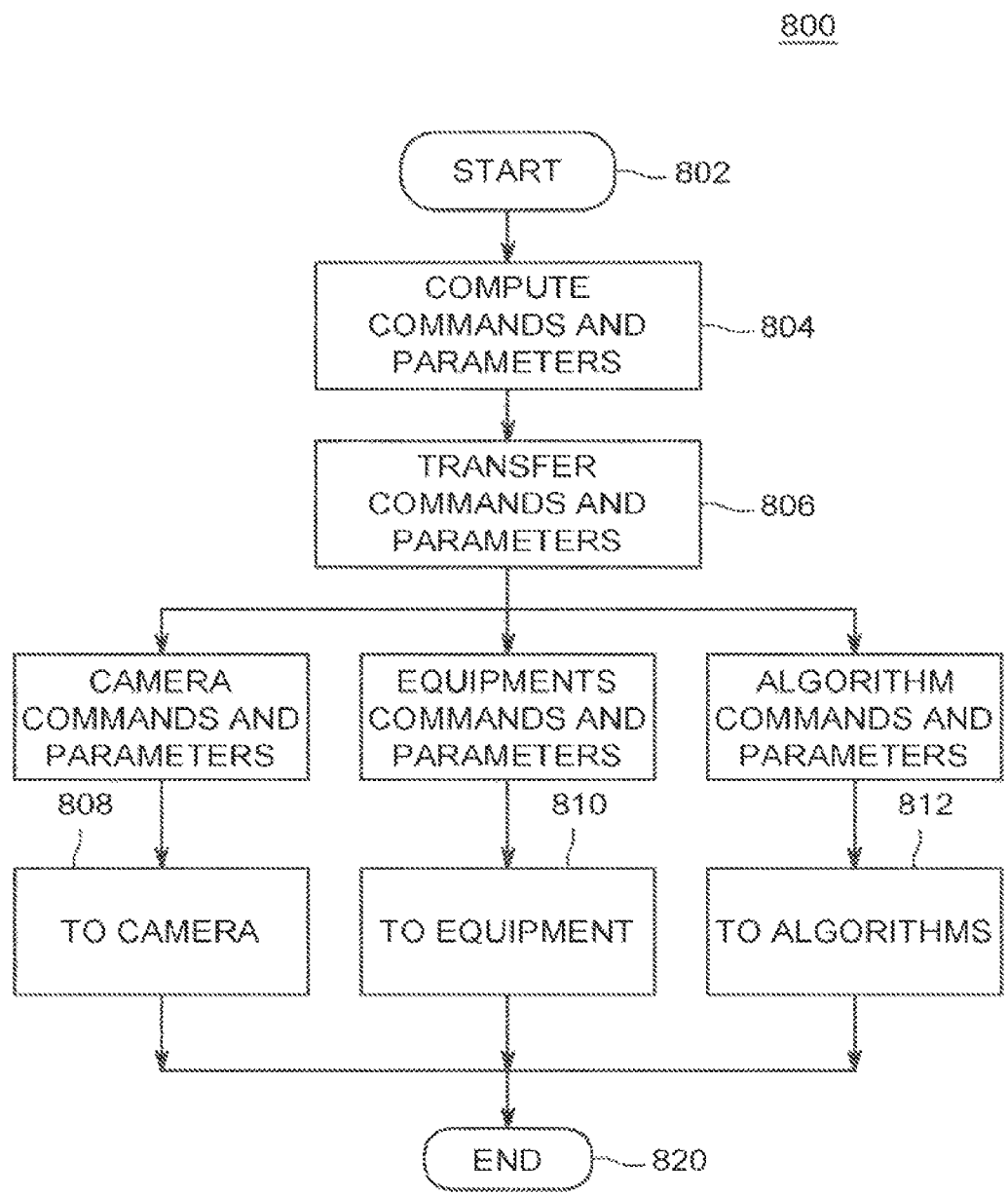
FIG. 8 is a flow diagram Illustrating a method for performing control processing in accordance with exemplary embodiments of the present invention.

FIG. 8 is a flow diagram illustrating a method 800 for performing control processing in accordance with exemplary embodiments of the present invention.

The control processor 214 is an implementation of method 800. Method 800 is embodied as a set of program instructions that are executed by one or more processors (e.g., CPU 112). Though the method is shown as occurring sequentially, embodiments of the present invention allow for each of the steps to be performed in parallel or in other sequences than shown.

Method 800 begins at step 802. At step 804, the command and parameter generator 652 generates commands and parameters based on the extracted information 420.

At step 806 the control processor 214 transfers commands and parameters. At step 808, camera commands and parameters are transferred to a camera. At step 810, equipment commands and parameters are transferred to equipment. At step 812, camera algorithm commands and parameters are transferred to the algorithm.

The method terminates at step 820.

It should be understood that it is a generic responsibility of the control block to control the recording parameters of the capture hardware so that they not only meet Remanent Imaging conditions but also produce usable images. In particular, many cameras provide automatic exposure control mechanisms that were not designed for Remanent Imaging. In Remanent Imaging mode, such mechanisms must typically be disabled to fix the exposure value, resulting in other recording parameters such as iris or gain no longer controlled by the camera. Left uncontrolled, these parameters may produce underexposed or saturated images. A simple, generic mechanism to implement adequate control consists in measuring predetermined image areas via mere integration of gray-level values to assess illumination levels and correct iris or gain values accordingly. In some embodiments, the control block may implement the Remanent-Adaptive region of interest (ROI) extraction capabilities described later in this disclosure to adapt the area being measured, or the frequency at which the measure computation is performed, to variations in scene content and illumination.

Figure 13:
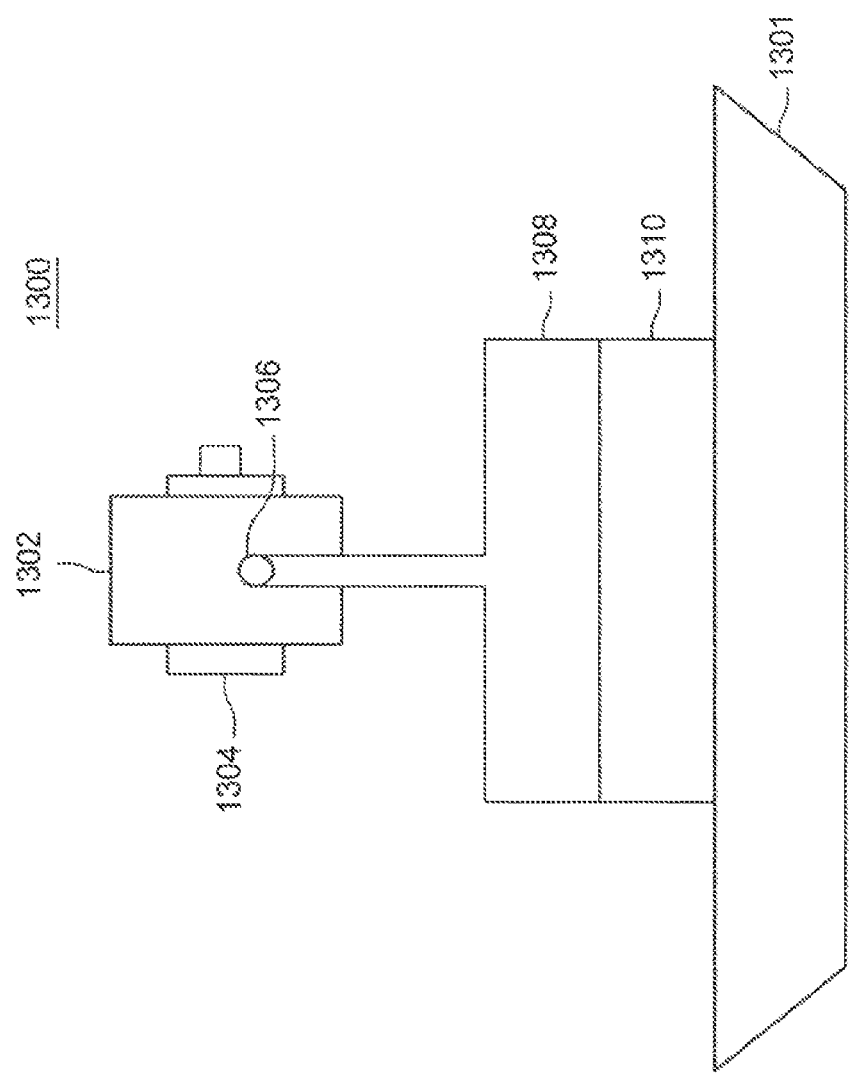
FIG. 13 is an illustration of one embodiment of the remanent imaging control method being used as a remote-controlled pan-and-tilt smart camera on a mobile apparatus in accordance with exemplary embodiments of the present invention.

In many embodiments, the main goal of the control block is to maintain an object of interest in some kind of homeostasis, and the degree of success is measured by the absence of global motion of that object of interest. In some embodiments for example, the goal may be to maintain image stability and cancel, by controlling the servomotors, the motion of a camera attached to a moving base, such as a raft floating in water, via a pan-tilt servo controlled mount. FIG. 13 is a schematic view of a self-contained smart camera system in such a situation.

Figure 9:
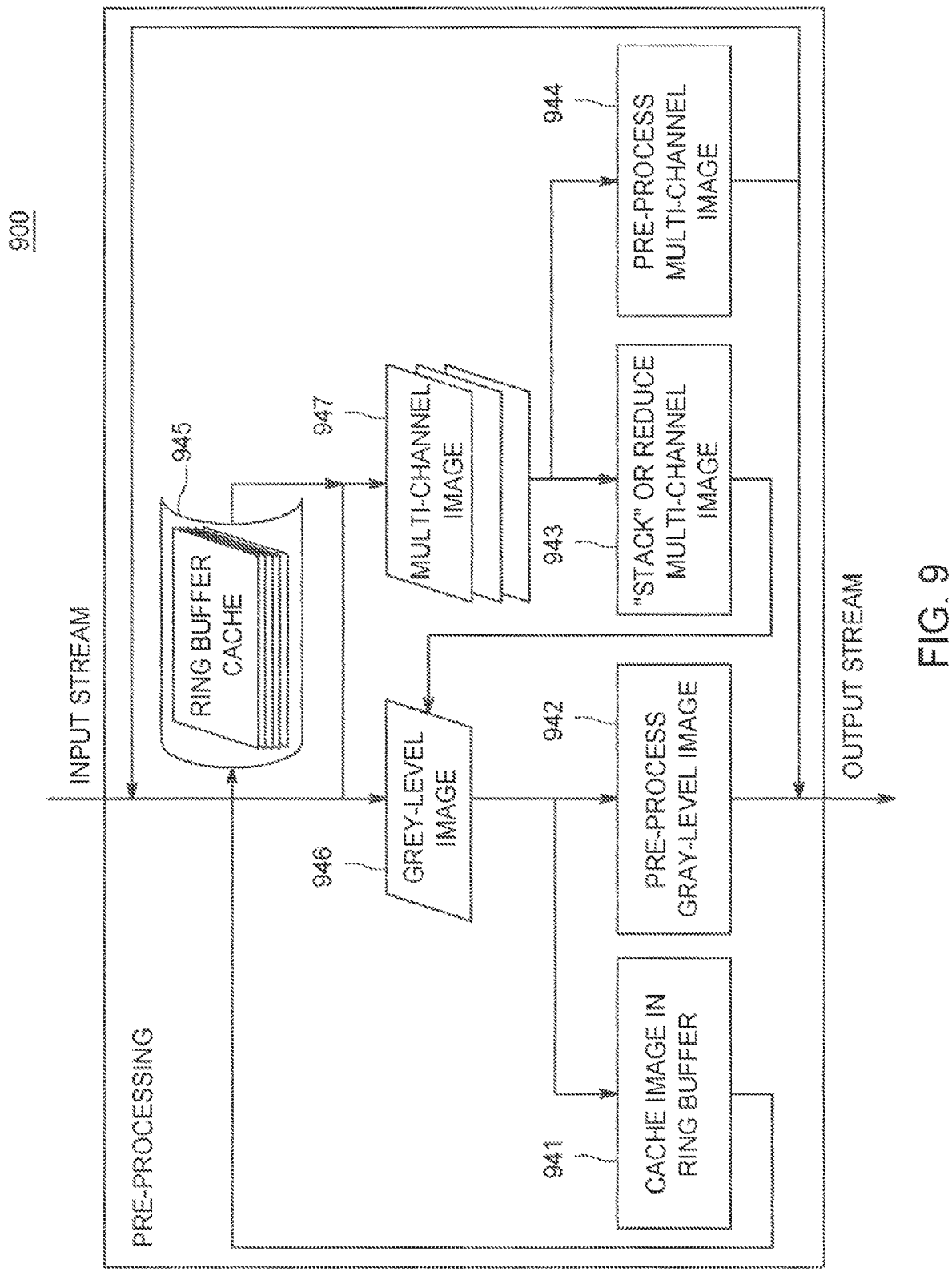
FIG. 9 is a flow diagram illustrating a method for performing preprocessing of remanent images in accordance with exemplary embodiments of the present invention.

FIG. 9 is a flow diagram illustrating a method 900 for performing preprocessing of one or more images in accordance with exemplary embodiments of the present invention.

The preprocessor 400 represents an implementation of the method 900, wherein the method 900 are shown as program instructions that are executed by one or more processing units. In some instances, preprocessing is performed by the capture device 102. Though the method is shown as occurring sequentially, embodiments of the present invention allow for each of the steps to be performed in parallel or in other sequences than shown.

Some treatments performed by processing blocks 941 and 942 use gray level images. Block 941 does not generate data in the output stream but caches its result into ring buffer 945. This is a common situation in embodiments that perform operations at a lower frequency than the frame rate or operate on image stacks.

In many embodiments, the majority of the pre-processing happens in block 942 which performs treatments including morphological operations, such as image dilation or opening; convolutions with small matrices, such as convolution with a Gaussian or a Laplacian of Gaussian kernel; operations affecting the image size, such as image pixel binning or image resizing; and operations on image areas, such as sum of image areas or region labeling for example. The output of block 942 typically consists of gray level images.

Other treatments may involve multiple images or multi-channel images. Examples of common multiple image operations include Image Stacking via maximization or summation (as discussed in the capture section), image sequence minimization, and difference between current and previous or background image. These treatments are performed by block 943 which merges its output to the input stream of blocks 941 and 942. Multi-channel images are pre-processed by block 944; typical examples include the pre-processing of RBG color images. The output of block 944 may consist of single or multiple gray-level images.

It should be noted that color images may not always be received in the input stream as multi-channel images. In some embodiments, Bayer filter-based color cameras may be used; in such instances, pre-processing may be performed on the raw two-dimensional image produced by the camera and produce a new gray level image by either (1) canceling the effect of the Bayer filter, (2) generating the intensities corresponding to a specific hue value, or (3) applying custom neighborhood transforms to emphasize a particular color or texture pattern.

While the range of pre-processing treatment candidates is wide, treatments that can be performed in a fully parallel manner on every pixel of the image by local computations (computations involving only neighboring pixels) are of particular interest due to their high performance potential. In embodiments implemented on parallel architectures, such treatments can be started on a given pixel as soon as the pixel and all its immediate neighbors are available; in some instances, this may happen even before the entire image is available. Also, it should be noted that not all treatments require a full image scan; in some embodiments for example, pre-processing may aim at blurring, or measuring the light intensity in, only one part of the image.

In some instances, pre-processing may employ algorithms that do not exhibit strong parallelism nor locality. In some embodiments for example, it may be desirable to control the camera iris and therefore measure the overall light intensity by summing all the pixel values of a single image. In other embodiments, the computation of a Fourier transform may be needed. Application specific considerations may determine that such operations are necessary at a frequency lower than the frame rate, thereby offering performance improvement opportunities.

Finally, while the pre-processing functional block is described in computational terms by discussing algorithmic implementations, it should be noted that in some embodiments, the pre-processing functional block may be advantageously implemented by some physical process. For example, if image blurring is desired, the effect can be produced by physically de-focusing the camera lens rather than computationally applying a convolution with a Gaussian filter.

FIG. 10 is a flow diagram illustrating a method 1000 for generating motion maps in accordance with exemplary embodiments of the present invention.

The motion processor 402 is an exemplary implementation of method 900, and the method 900 is represented by program instructions that are executed by one or more CPUs 112. Though the method is shown as occurring sequentially, embodiments of the present invention allow for each of the steps to be performed in parallel or in sequences other than those shown.

Many remanent imaging control embodiments leverage the motion mapping capability of the control method. This capability consists in extracting a super-set of all object trajectories from a single Remanent Image using geometric or symbolic algorithms. This capability can be grasped intuitively by thinking of the familiar city-by-night long exposure photos showing the light trails left by cars headlights: an algorithm that would ignore all points in the image except those of maximum light intensity would filter out everything but the car trajectories.

The motion mapping functional block implements that capability by generating a synthetic image representing a super-set of all object trajectories extracted from an input image; we call this synthetic image the "Motion Map". This synthetic image can be a single-channel Boolean or gray-level image or a multi-channel image and is made of image pixels coded in various ways, including bits, signed or unsigned integers of the appropriate size, or single or double precision floating-point numbers.

It should be understood that this description of the input and output of the "motion mapping" block in terms of input and output images suggests a step wise, sequential process which may not actually take place in this manner in all embodiments. In particular, in embodiments in which the captured images are streamed, the motion mapping functional block may be implemented by stream processing and the actual output of this block may consist of one or a plurality of byte streams in which actual output images never materialize as such. Furthermore, some embodiments may access the pixel values of the camera sensor asynchronously and in parallel and compute and output the Motion Map in a highly parallel manner.

Notwithstanding these remarks, FIG. 10 is a diagrammatic overview of the motion mapping block. The various outputs that can be produced by the motion mapping block are represented by the five data blocks 1171-1175. Actual valid output may consists of the data 1171 only, or any sequence of data starting with 1171; in other words, the motion mapping block output may consists in any of the sets {1171}, {1171, 1172}, {1171, 1172, 1173}, {1171, 1172, 1173, 1174}, and {1171, 1172, 1173, 1174, 1175}. All output combinations are called Motion Map, and their specific components are named as noted on FIG. 10, and will be discussed below.

Data 1171, the basic Motion Map, is of special significance. It is a required output of the Motion Mapping block; as a super-set of the trajectories of all moving objects during the exposure of the image, it contains essential motion information in a compact format. It can be computed very efficiently by extracting all "Crest Pixels" in the gray level image, which we define as pixels having at least two lower gray-level valued neighbors "on each side", as will be further discussed below and illustrated on FIG. 12. The mathematical justification for its computation results from a fundamental property of Remanent Imaging.

The property can be summarized as follows. We model the camera recording process by considering that the camera lens assembly maps, at any time, a three-dimensional scene onto the plane of the camera sensor as a two dimensional gray-level image. In turn, that image at time t can be modeled with a real-valued function p that maps the (x, y) coordinates of each sensor point to the value p(x, y, t) of the irradiated power at that point at that time; we call area-time the definition domain of p. Composing p with the camera lens assembly mapping, each point in the scene is mapped, over time, to a path in the area-time space. Such paths can be viewed as trajectories in area-time by using time as a parameter. Brilliant punctual objects in the scene are defined as those that create trajectories along which the irradiated power is locally maximal on any time-constant plane; in other words, on any planar section of area-time defined by t=t0, the irradiated power is locally maximal at the point where the trajectory intersects the plane. As a result, under adequate illumination conditions, trajectories of brilliant punctual objects captured on two-dimensional Remanent Images will be such that, at any point along those trajectories, an intersecting path can be found on the Remanent Image plane along which the gray-level image value is locally maximal at the point of intersection between the path and the trajectory. We call this property the "Crosswise Maximum" property.

Adequate illumination conditions are met by sufficient consistency in the amount of light power objects radiate during the recording period; objects should not disappear because of sudden drops in radiated power or because of occlusions by other objects in the scene. When the illumination conditions are no longer adequate, it may still be possible to map motion using a variety of additional processing steps; in some instances, reducing the resolution may offset transient illumination discontinuities; in some other instances, classical multi-tracking methods can be applied to "patch" trajectories.

Figure 11:
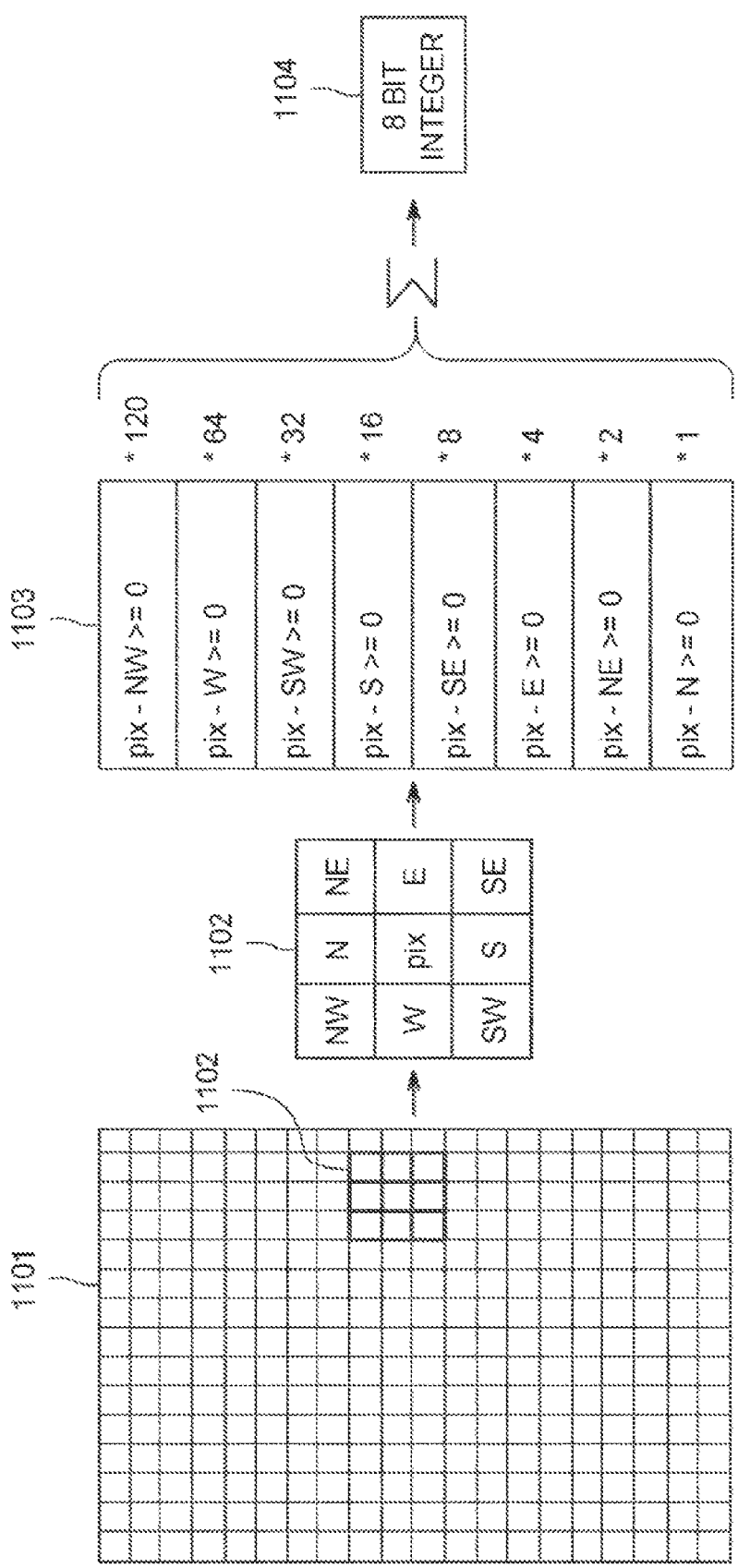
FIG. 11 illustrates an algorithm for extracting the trajectory of objects in remanent images in accordance with exemplary embodiments of the present invention.
Figure 12:
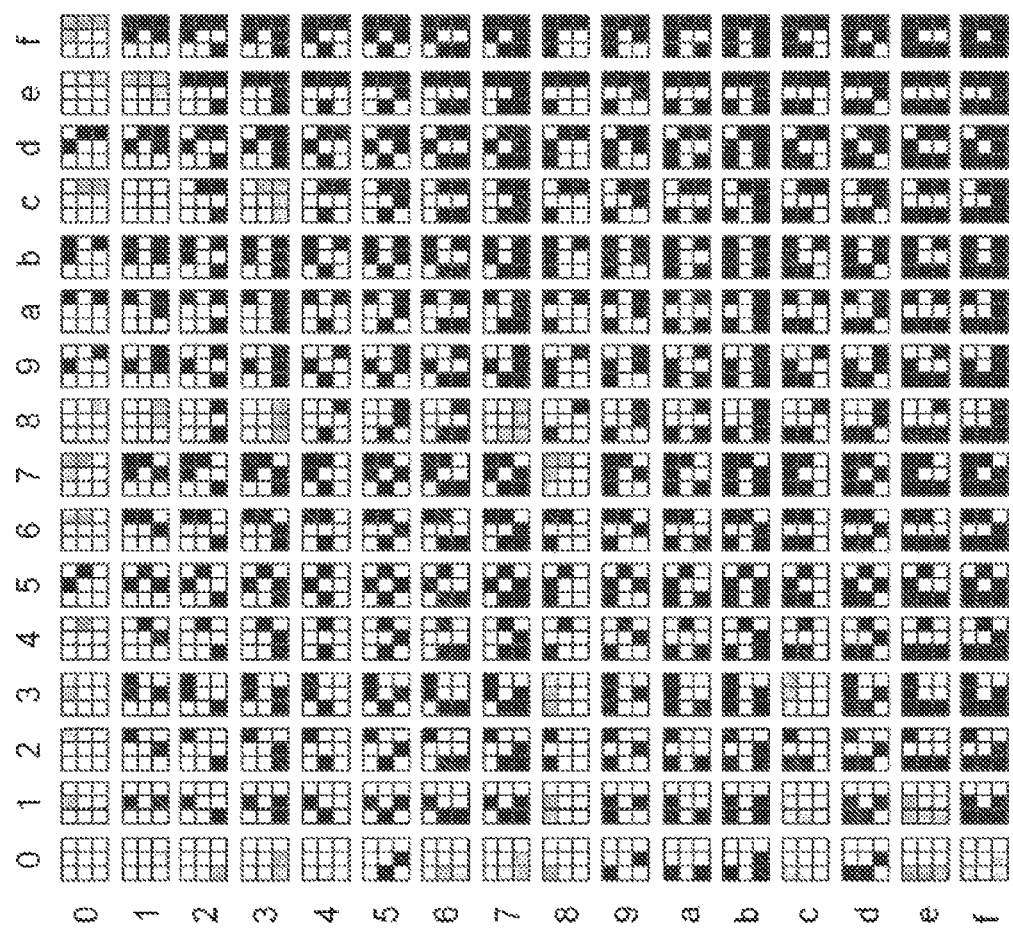
FIG. 12 illustrates a lookup table used by the trajectory extraction algorithm of FIG. 11 in accordance with exemplary embodiments of the present invention.

Assuming the recording resolution is such that the Crosswise Maximum property holds after digitization (that is, the range of gray level values is large enough and the recording resolution is fine enough that light trajectories are not flattened into plateaus and are not lumped in or absorbed by adjacent blobs of light), the property can be used to characterize pixel trajectories—the "Crest Pixels" introduced earlier—based on gray level differences with their immediate neighbors. The computation of the basic Motion Map—the trajectory super-set—can be explained by describing a specific Crest Pixels extraction algorithm illustrated in diagrammatic form in FIGS. 11 and 12. FIG. 12 is a diagrammatic view of all possible pixel neighborhood configurations (256 in total), displayed as a 16-column table with 16 rows. This table represents a look up table ("LUT"): the sixteen rows and columns in the table are numbered using hexadecimal digits, and each table cell contains a 3×3 checkerboard diagram representing the immediate neighborhood of a pixel. The Boolean value contained in each table cell is true if the checkerboard contains black and white pixels and false if it contains gray and white pixels.

The color of the periphery pixels in each 3×3 checkerboard is determined by its gray level value compared to that of the center pixel. Periphery pixels with values strictly higher than the center are shown in white other pixels are shown in black or gray, depending on whether or not the neighborhood configuration makes the center pixel a Crest Pixel. Configurations with black pixels characterize a Crest Pixel, configurations with gray pixels do not. The characteristic used to define Crest Pixels can be stated as so: two periphery pixels can be found with values lower or equal to that of the center, and these pixels are either opposite to each other with respect to the center pixel, or are separated from each other on both sides by pixels with higher values than the center. It should be understood that other characterizations of Crest Pixels are possible. For example, a minimum threshold difference may be required before lower valued neighbors are recognized as such, or a different LUT can be substituted to that shown in FIG. 12. Also, more precise algorithms exist that may provide a finer characterization of Crest Pixels; these may involve the values of more distant neighbors and may therefore be more computationally expensive.

The Crosswise Maximum property can be translated in terms of a pixel's immediate neighborhood and thus (1) fast algorithms can be implemented to recognize Crest Pixels, and (2) these algorithms, because they are local, can be run in a fully parallel manner on all pixels of an image simultaneously. Therefore, the Motion Map can be computed in linear time relative to image pixel size. FIG. 11 is a diagrammatic view illustrating the algorithm flow: a 3×3 neighborhood 1102 is selected in input image 1101; the value of the center pixel is compared to the value of its 8 neighbor pixels to form a Boolean column vector 1103, which is then transformed into unsigned 8-bit integer 1104 by a simple byte coding process. The value is then used to access the LUT represented by the table in FIG. 12. As a result, each pixel in input image 1101 can be assigned a Boolean value, which represent the crest lines of the image and which we call Motion Map. Trajectories of brilliant punctual objects are to be found among these crests lines.

In addition, the Crosswise Maximum property is robust with respect to spatio-temporal resolution. As long as the movement remains visible after reducing the spatial or temporal resolution, the Crosswise Maximum property will still apply; this means that one can apply the same algorithm to a lower spatio temporal resolution image in order to reduce processing load. Furthermore, and as long as the movement remains visible, resolution can be reduced independently in each three directions (sensor width, sensor length, and frame rate). See FIG. 4C for examples of the algorithm applied to synthetic image sequences which illustrates the robustness of the Maximum Crosswise property with respect to spatio-temporal resolution.

In some embodiments, it is desirable that the Motion Map contain the trajectory of objects of interests and these objects only, and that trajectories be reduced to their medial axis (skeletonized) with no extraneous pixels, i.e. the "Clean Motion Maps" 424. There is a multitude of ways in which such clean maps can be generated, depending on the application. In some embodiments, a Clean Motion Map will be produced natively by simply computing the Motion Map from consecutive image differences and skeletonizing the result. In other embodiments, the generation of a clean map may require specialized processing to remove background or irrelevant objects or compensate for camera motion.

Clean Motion Maps are computed by process block 1164, which overwrites its output onto basic Motion Map 1171. In some embodiments, Clean Motion Map computations may involve continuity considerations with the Clean Motion Map value computed on the previous image; data cache 1176 is used for that purpose. Block 1164 accesses the previous value from data cache 1176 and copies its output to it.

An example of native Clean Motion Map generation is provided with an embodiment which may be used to monitor all moving objects, including planets, meteoroids, satellites, and airplanes, in a clear night sky. Such an embodiment may consist of a single, fixed camera pointing skyward, with a lens of a focal length matching the solid angle of interest and focused to infinity, and imaging at 3.75 frames per second with a 266 ms exposure time. Images may be streamed to a computer that extracts a Motion Map from the difference of consecutive images using the algorithm described in FIGS. 11 and 12; the resulting Motion Map can be further thinned via mathematical morphology by using a skeletonization transform. Such map would be natively "clean" as it would only contain trajectories of moving brilliant objects of interest.

A variety of other refinements can be applied to the process of Motion Map extraction. For example, algorithms performing skeletonization, connected component labeling, line segment recognition or decomposition, recognition of repetitive motifs or pattern matching can be applied to the output of the crest extraction algorithm described above. Whether or not these refinements are performed as part of the motion mapping block depends on a variety of factors; in particular, as discussed below when describing velocity map generation, some of these refinements impact the size of the output generated by the motion mapping block and may be advantageously performed in the control block in embodiments where the extract and control functions are performed on different hardware components.

A few particularly noteworthy refinements are now mentioned. A first refinement consists of extracting the Motion Map not from the current image, but from its difference with the previous image; this way, immobile objects are removed and the super-set of trajectory so produced contains little extraneous data.

Another noteworthy refinement is the extraction of trajectory tangents to create a "Velocity Orientation Map" by way of line segment filtering. Correlating a Motion Map with a set of small line segments with evenly distributed angular orientation gives us information on the tangent angle at any trajectory point where the velocity is continuous. In such map, the orientation is typically known modulo $\pi$. Further refinements may produce a "Velocity Direction Map" in which the orientation is determined modulo $2\pi$, or a "Velocity Field Map", in which the velocity vector is determined in direction and magnitude at each trajectory point.

These maps are represented on FIG. 10 by data 1172, 1173, and 1174, and their generation is performed by processing blocks 1162, 1163, and 1165, respectively.

When velocity maps are generated, the output of the motion mapping block becomes a multi-channel image, which are still referred to as Motion Maps, with the first channel containing the basic motion map, and additional channels containing the velocity maps. Velocity Orientation Maps (data 1172 on FIG. 10) require a single additional channel; Velocity Direction Maps (data 1173 on FIG. 10) may require one or two channels, depending on whether signed numbers are used in the image coding scheme of the motion mapping output image. Velocity Field Maps (data 1174 on FIG. 10) require at least two channels. Considerations regarding size and format of the Motion Map may become important when designing the architecture of a specific embodiment as it impacts data communication bandwidth and may impact performance. In particular, in some embodiments where various functional blocks are implemented on different hardware components, it is advantageous to compute Motion Maps refinements in function blocks downstream from the motion mapping block. For example, if an embodiment implements Extract and Control on different hardware components and the processing requires a full Velocity Field Map, then it may be best to compute it as part of the Control block.

FIG. 4E is a diagrammatic representation of a simple Velocity Orientation Map extraction algorithm and its application to the trajectory of the brilliant point in FIG. 4C. Filter bank 441 is made up of same-length segments having orientations evenly distributed over $[0, \pi]$; the length of the segment is determined, based on the desired angular resolution (7 in the present example), as the smallest integer producing different images at each angular value. Then image XXX is convolved with each of this filter, producing a stack 442 of gray level images, indexed from 1 to 7. Image 443 is produced by taking, at each trajectory point, the stack index of the image on which the correlation value at that point is maximal; non-trajectory points are set to zero. Image 444 is subsequently produced by replacing each index by the corresponding rounded angular value in degrees, shifted by one so that no value is null. The output then consists of a two-channel image, the basic Motion Map in one channel and the Velocity Orientation Map in the other. It should be understood that Velocity Orientation Map values at non trajectory points have no velocity orientation meaning.

In many embodiments, Velocity Orientation Map extraction performance may be improved by keeping the angular resolution very low, so that the convolution window in filter bank 441 is very small and the overall bank size is small. Depending on actual scene dynamics and capture frame rate, it may also be advantageous to perform the computation on a reduced resolution Motion Map.

The refinement of a Velocity Orientation Map into a Velocity Direction Map usually requires some additional information. In some embodiments, sequential considerations may be used to determine the direction of movement and maintain it across consecutive images. This dependency is illustrated by the interaction of block 1163 with data cache 1177, which is used to access previous image values. In other embodiments, knowledge about the objects of interest may suffice to decide on the direction of movement in individual Remanent Images. Conversely, in many embodiments in which the power radiation behavior of objects of interest is known, the refinement of a Velocity Direction Map into a Velocity Field Map may be done directly by interpreting values from the basic motion map without regard to the sequential context. For example, if the power radiated by moving objects during the exposure of a single image can be assumed to be constant, then the gray level values of trajectory points will linearly correlate with the actual velocity of the object at these points, and the magnitude of the velocity vector field can be computed from gray-level values on the basic Motion Map of a single image with no reference to other images in the sequence. The potential dependency of the Velocity Field Map computation on light field information is illustrated in method 1000. Light field data is passed in the input stream as input data 1179 (typically expressed as an image matrix) and passed to block 1165. If the light field is constant or slow varying, the light field data can be hard coded or cached to save data transmission bandwidth.

In the same vein of considerations, Acceleration Magnitude Maps can be computed from Velocity Field Maps by differentiating along trajectories. This computation is illustrated by block 1166 which generates output data 1175. In some embodiments for example, such maps may be useful to locate discontinuities in kinematic behavior, such as sudden peaks in acceleration.

Although the building of the basic Motion Map does not include the generation of any quantitative data, we will see that the basic Motion Map alone is sufficient in some embodiments to perform control tasks efficiently. In other embodiments, other quantitative measures are needed, and we now discuss examples of steps involved in their generations.

Figure 14A:
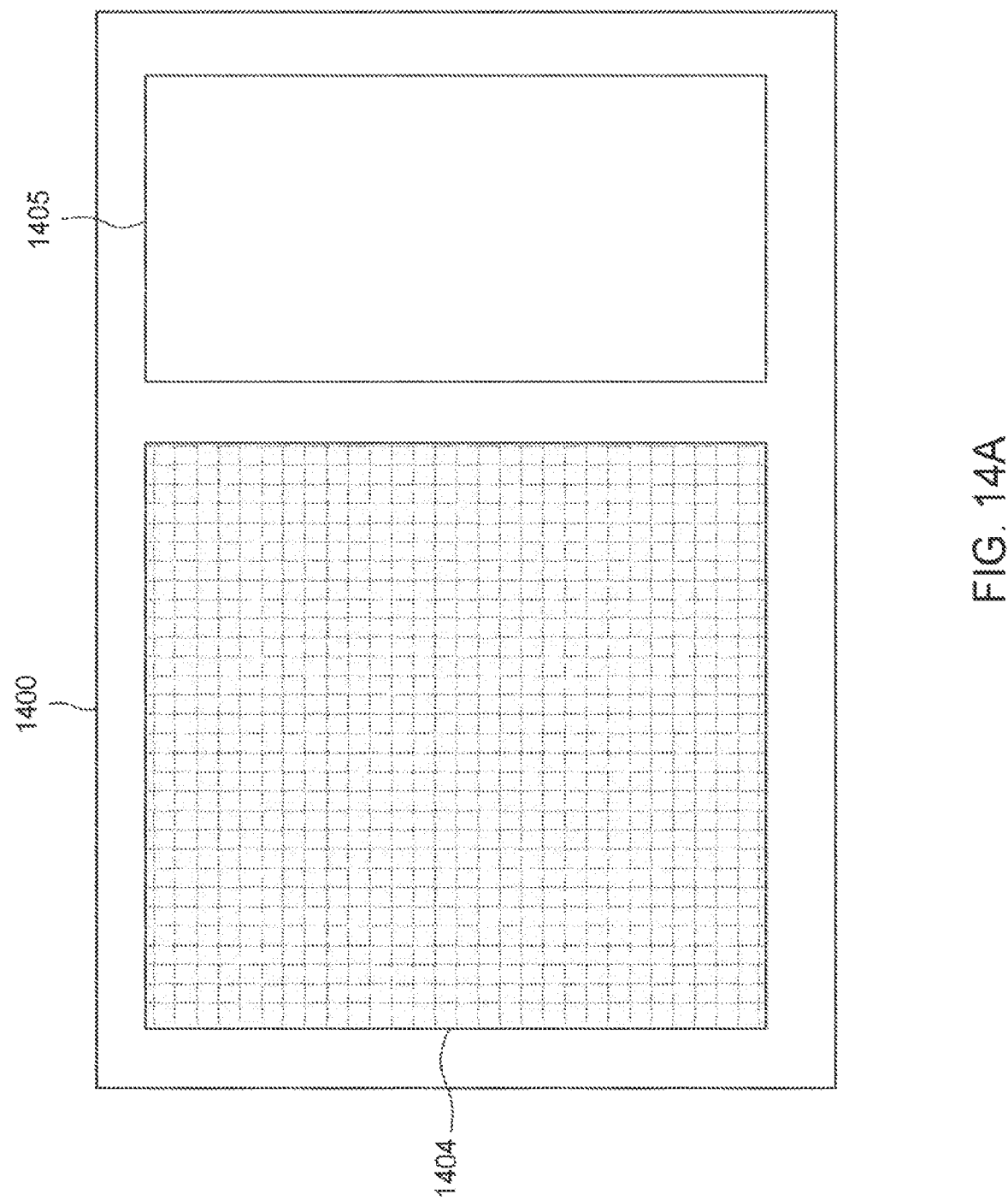
FIG. 14A is an illustration of a sensor chip with photo-electron integration in accordance with exemplary embodiments of the present invention.

The algorithm illustrated in FIGS. 11 and 12 works by examining the 2-dimensional, 8-pixel neighborhood of each pixel as described above. FIG. 14C is an illustration of light hitting the sensor chip illustrated in FIG. 14A in accordance with exemplary embodiments of the present invention. Illustration 1450 is a schematic view of a cuboid tessellation section that fully covers 27 cuboids belonging to three consecutive Remanent Images and which therefore form three layers. Cuboids on illustration 1450 are represented by a subset of their edges. For purposes of clarity, only one surface at each layer is shown, and only cuboid edges belonging to that surface are shown while all other edges are hidden.

Illustration 1450 also depicts a 27-vertex graph, one vertex on each of the 27 cuboids and 26 arcs connect the central vertex to all others. By mapping the remanent image processed on FIG. 11 to the middle layer in illustration 1450, grid 1102 maps to the grid in the middle layer on illustration 1450. The 8-pixel neighborhood processed by the two dimensional Crest Pixel extraction algorithm is now seen as a subset of a larger, 26-neighbor, three dimensional neighborhood. According to such a representation, the RIC 103 can use three-dimensional mathematical morphology algorithms, such as 3-dimensional connected-component labeling algorithms, operating on the graph in illustration 1450 to build alternative implementations of the motion mapping processing block. See FIG. 14A-14B for more detail on how such algorithms can provide insights into design of new hardware.

FIG. 13 is an illustration of an apparatus 1300 of the remanent imaging control method being used to control a pan tilt smart camera on a mobile apparatus in accordance with exemplary modern dance of the present invention;

In some embodiments, the RIC 103 maintains image stability and cancels, by controlling some mechanical means such as servo motors, the motion of a capture device 1304 attached to a moving base 1301, such as a raft floating in water, via a pan-tilt servo controlled mount 1308.

Camera system 1304 is mounted on moving base 1301 via an assembly comprising base 1310 and bracket mount subsystems 1306, 1302 and 1308. Each bracket mount subsystem controls one camera angle by, for example, a separate servomotor.

Mounts 1302, 1306 and 1308 control the camera system roll, pitch, and yaw angles, respectively. The camera system 1304 obtains power from a power storage unit housed in base 1310. The entire assembly is wired using, for example, slip ring type connectors so that the camera system can obtain power and transmit command to the mechanics (e.g., servomotors) without limiting their angular range.

In this embodiment, the RIC 103 may be embedded in the camera system 1304 as a chip, or as computer instructions on memory executed by a processor of the camera system 1304. The RIC 103 receives a remanent imaging sequence via the camera system 1304, extracts motion maps for objects in the scene that are seemingly in motion, and determines that this is the result of instable movements caused by the moving base 1301. Thus, the extracted information is used by the RIC 103 to generate commands and parameters that the mounts 1302, 1206, 1308 and camera system 1304 can receive, interpret and implement, to stabilize and cancel out the movement of the moving base 1301.

Figure 14B:
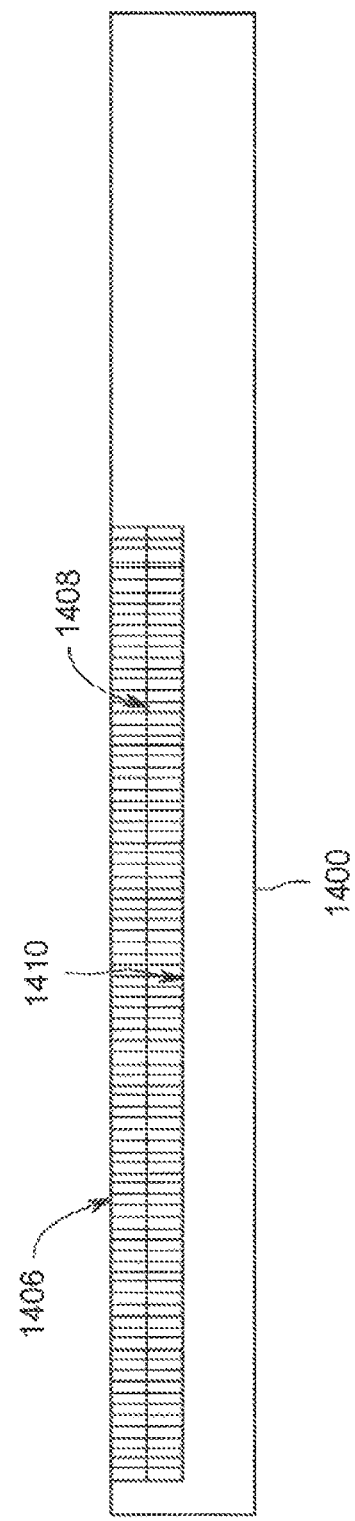
FIG. 14B as a side view of the sensor chip of FIG. 14 in accordance with exemplary embodiments of the present invention.

FIG. 14A is a top-down view and FIG. 14B is a side view of a remanent imaging sensor 1400 with photoelectron integration in accordance with exemplary embodiments of the present invention.

The sensor 1400 is a three-dimensional sensor chip in which photo-electron integration occurs in three different layers over the entire chip volume. Each sensor layer consists in hardware-implemented smart pixels that can integrate as well as measure photo-electrons, perform simple operations, and communicate with other layers or other on-chip logic blocks. The three layers are depicted in FIG. 14B and inter-pixel communication is depicted in FIG. 14C.

The sensor 1400 comprises a photosensitive area 1404 and a power/logic section 1405. The photosensitive area 1404 further comprises a photo-receptive layer 1406, a transition layer 1408 and a remanent layer 1410, each layer comprising a set of pixels.

As shown in FIG. 14C, emitted photons coincide with the sensor 1400 in FIG. 14B at the photo-receptive layer 1406, where photo-sensitive pixels accumulate photo-electrons during frame exposure.

At the transition layer 1408, active pixels perform lookup to determine status, output a value if needed, transfer the current value to the remanent layer 1410 and overwrite the current value with a new value after the frame exposure is complete. At the remanent layer 1410, accumulator pixels accumulate values from the transition layer 1406 and, when requested by the RIC 103, output their value, and then refresh.

In the context of computer vision, remanent imaging is a redistribution of the tasks between the sensor (e.g., sensor 1400) and the computer (e.g. RIC 103). Remanent Imaging Control as disclosed in the present invention redistributes the roles of the sensor and the computer by assigning some of the integrations tasks to the sensor 1400, leveraging its native functions.

Since in most practical situations the sensor comes tightly integrated in a computing system, the camera board, or, in some cases, the sensor chip itself can be viewed as a computing system, in some embodiments, the sensor board may perform some computations, for example, those related directly to integration. Thus the sensor 1400 and sensor-level algorithms described herein bypass some or all of the processing chain downstream at the CPU level that exist in other implementations, reducing processor usage and possible bandwidth consumption.

The approach in developing new algorithms comprises, given a particular remanent imaging control embodiment or embodiments for which new sensor or low-level algorithm design opportunities need to be identified, look at these embodiments from a dataflow point of view and express the data stream in terms of the cuboid tessellation shown in FIG. 3B and with relation to remanent image sequence capture.

Figure 15:
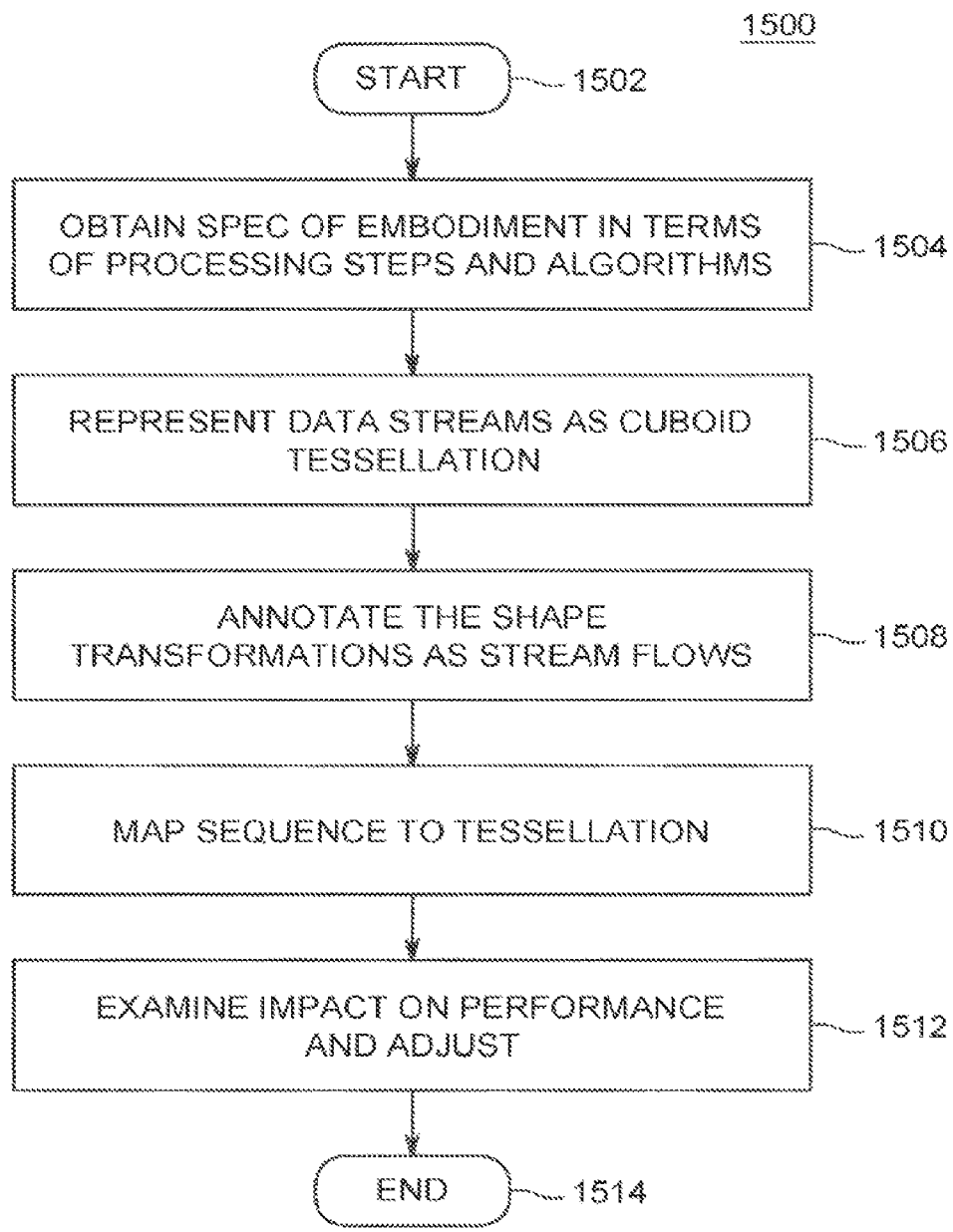
FIG. 15 illustrates a method 1500 for developing new algorithms given a particular remanent imaging control embodiment in accordance with exemplary embodiments of the present invention.

FIG. 15 illustrates a method 1500 for developing new algorithms given a particular remanent imaging control embodiment in accordance with exemplary embodiments of the present invention. The approach consists in taking the following steps as illustrated in the flow diagram for method 1500:

The method starts at step 1502 and proceeds towards step 1504 where the specification of a remanent imaging control embodiment is obtained in terms of the processing blocks and types of algorithms discussed above.

The method proceeds to step 1504, where the data stream are represented as a cuboid tessellation of the area-time volume with its base origin on the sensor plane and for as long as its integrity is maintained in the downstream processing despite having its actual format modified by streaming. By maintaining the tessellation integrity, we mean performing processing that does not prevent the resulting data from being mapped, conceptually at least, onto the section of the tessellation corresponding to that time step. For example, applying a convolution to an image, although it may be performed by a serial algorithm, produces and propagates a new image that can be mapped to the tessellation, which integrity is therefore maintained. On the other hand, summing all pixel values and outputting a scalar value does alter the structure of the data: the tessellation is no longer meaningful beyond that point and its integrity is therefore not maintained. Considered along the time dimension, the tessellation provides information on data bandwidth and processing load. In embodiments operating several sensors simultaneously, cuboid tessellations originating from each sensor should be represented and synchronized. In some situations, typically corresponding to sensor fusion, the tessellations may merge in whole or in part. The resulting tessellation may be used statically to represent all the consecutive states of a single image captured by the sensor, or dynamically to follow a discrete sequence or a stream of images.

Then, the method 1500 annotates the shape transformations undergone by the tessellation as the stream flows from the sensor to the processing blocks at step 1508. These annotations should include bandwidth constraints imposed by network and interface components; for example, data transferred from a camera to a computer via USB is bandwidth limited by USB's maximum transfer rate.

At step 1510, the algorithmic sequence is mapped to the tessellation as it flows and until its integrity has been compromised. Subsequently, at step 1512, on the resulting map, the potential impact on performance (output quality, data bandwidth, and processing load) is examined of permuting algorithmic steps and relocating the steps upstream as much as possible.

The method terminates at step 1514.

Representing the data flow in terms of tessellation is always possible as it simply expresses the sensor integration operation. In the case of Remanent Imaging, the tessellation forms a covering of a compact area-time volume and is of practical interest. Since it is a three dimensional object, its handling may be quite complex at times and require the use of two-dimensional projections. A remanent imaging control embodiment, referred to as a "kineseoscope" which will be discuss later in this disclosure, can be used as a powerful tool to help represent and handle these tessellations via 2-dimensional projections.

A variation of the above five-step method 1500 is used for designing and fine-tuning the architecture of a given embodiment, a problem which consists in finding a good, preferably optimal, mapping of the processing to be performed to the available hardware components. For this purpose, hardware components need first to be characterized. Hardware components may include custom and off-the-shelf components such as sensors, board-level or embedded cameras, camera systems, ASICs, FPGAs, CPUs, GPUs, and computer systems. These components can be sorted into (1) basic processing units, which include sensors, ASICs, FPGAs, CPUs, and GPUs, (2) system-level components, which include boards, and (3) system level components, which include pre-assembled systems such as desktop computers and stand-alone cameras. The criteria for this categorization is data locality: components in the first group can be programmed to perform the bulk of their computation by accessing data in local caches, operations typically most often performed in only a few clock cycles, typically less than a hundred. At the other extreme, systems access and exchange data using relatively slow methods involving interface or network protocols.

After this inventory has been made, the method 1500 can be applied by first going through steps 1504-1510 above and produce a tessellation on which the architecture design can be represented. Next, this tessellation will be annotated to show on which hardware component, at the most relevant level, the different algorithms mapped as part of 1510 are being executed; for example, if some pre-processing treatment is performed on a board-level component, that board will be represented by marking up the corresponding section of the tessellation. Step 1512 will now consist in examining the data bandwidth and processing load potential impact of modifying the algorithm-hardware mapping, keeping in mind that changes in the mapping will, in many cases, also change the shape of the tessellation.

For example, referring to the earlier example, the 26-vertex graph in FIG. 14C may be used to guide hardware development efforts, using FPGAs or designing new ASICs or custom sensors, to produce a hardware components capable of extracting parts of the Motion Map, such as basic Motion or Velocity Orientation Maps, directly upon image capture.

Figure 16:
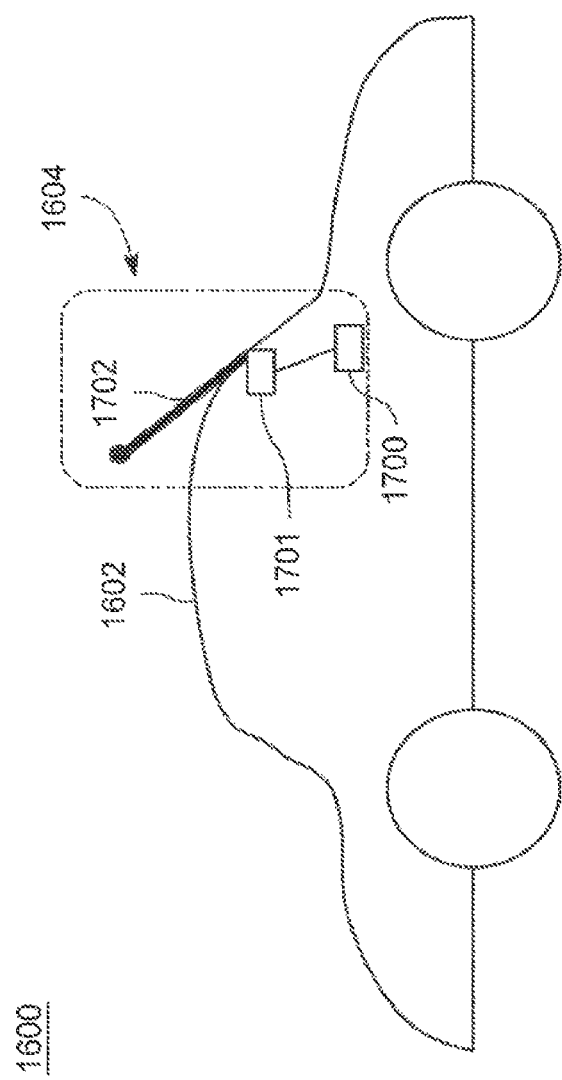
FIG. 16 is an illustration of another embodiment of a compound eye mounted to a vehicle to provide navigational control via remanent imaging control in accordance with exemplary embodiments of the present invention.
Figure 17:
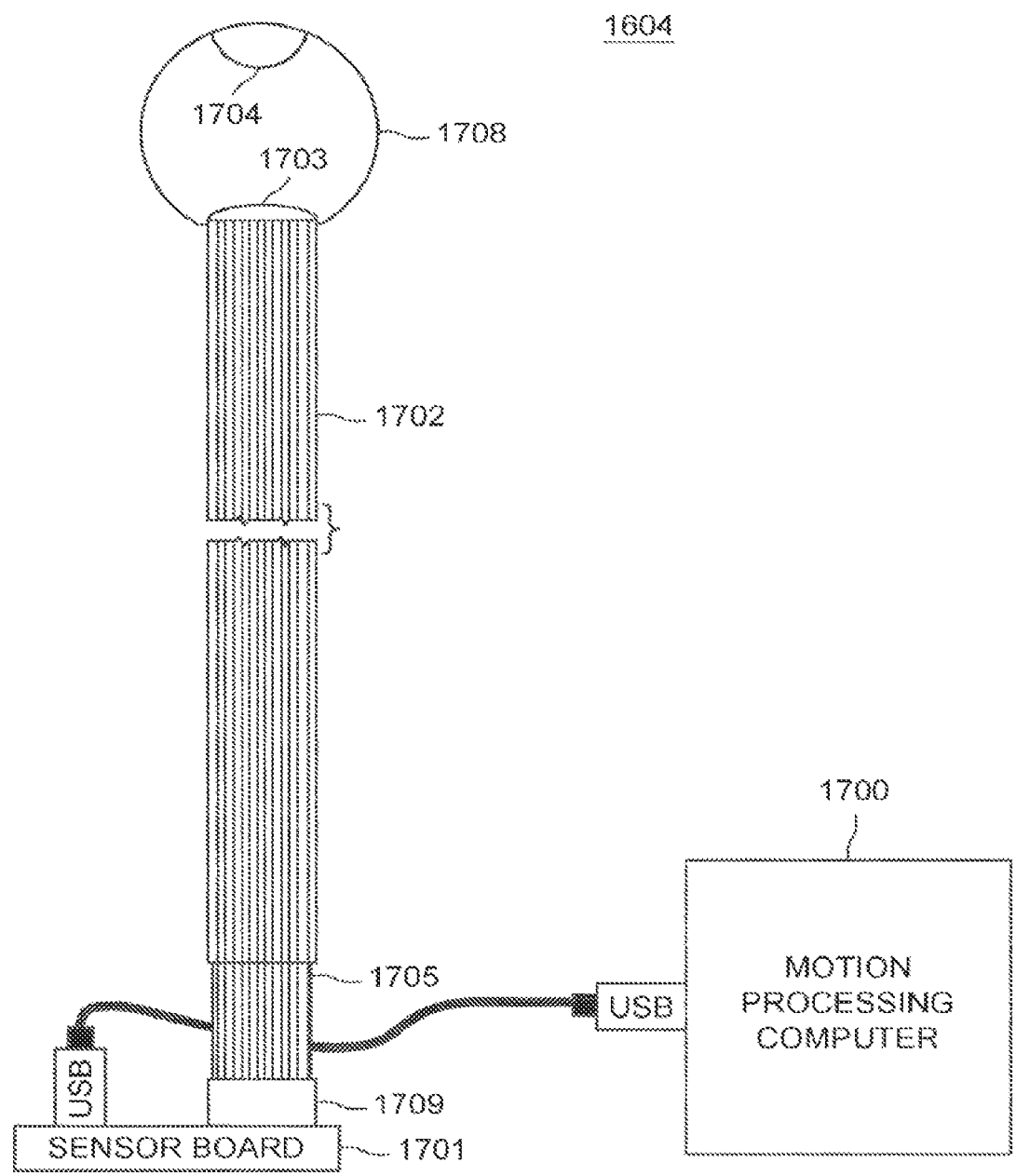
FIG. 17 is a detailed illustration of the compound eye shown in FIG. 16 in accordance with exemplary embodiments of the present invention.
Figure 18:
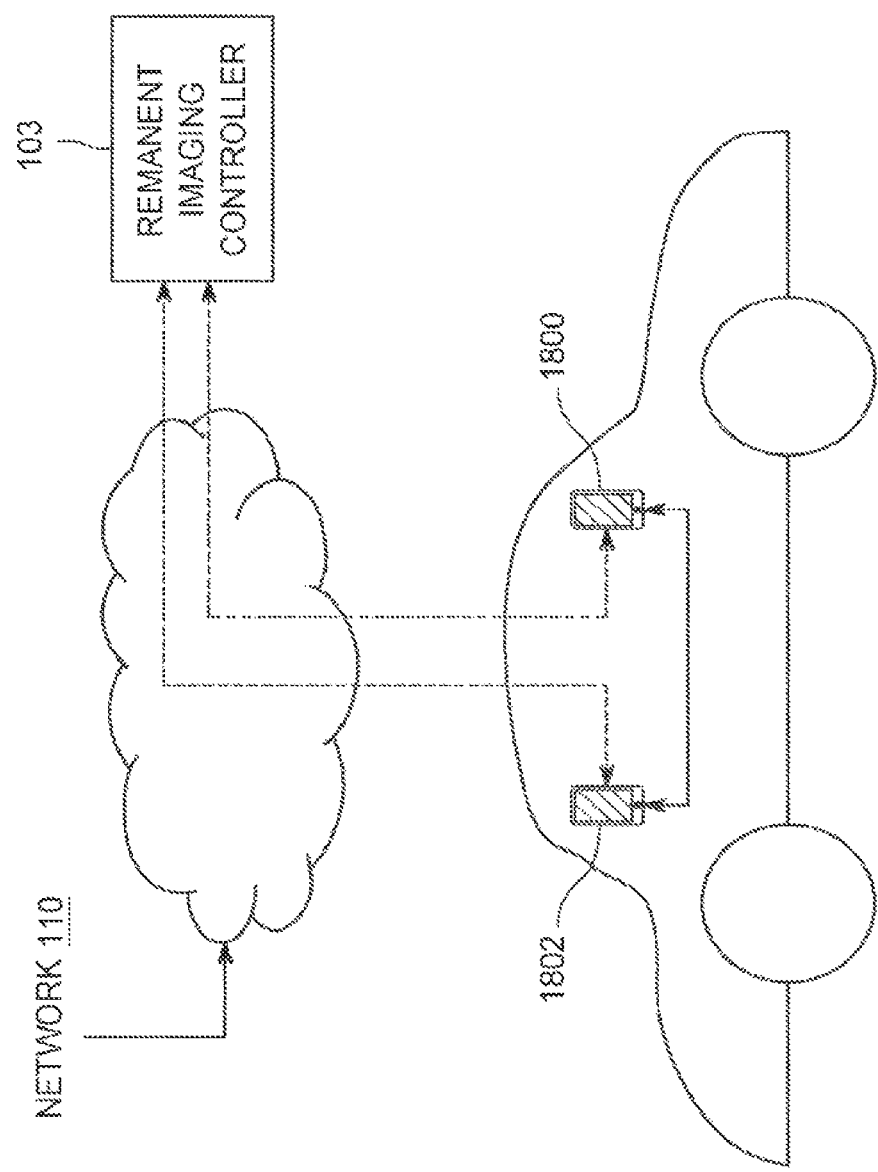
FIG. 18 is an illustration of a system for preserving vehicle and passenger safety in accordance with exemplary embodiments of the present invention.

The architecture design task also includes exploring and comparing alternative strategies between computation precision and frequency that exploit the multi-resolution aspect inherent to Remanent Imaging and displayed by cuboid tessellations. Architecture alternatives so identified can then be compared based on formal algorithmic considerations, or implemented and compared via simulation or experiments. For example, in embodiments that perform dominant motion cancellation, such as depicted in FIG. 16-18, trade-offs exist between command precision and frequency: a system relying on high frequency remanent imaging may be able to generate a stream of simple commands at high frequency, while another system may be able to issue more precise, better calibrated commands by a more thorough analysis of images performed less frequently. For example, one Velocity Orientation Map extraction algorithm uses filter banks to extract angular values; a 9×9 filtering window of diameter 9 could be used to build a 9 filter bank capable of discriminating between 9 angular values. On the other hand, a 3×3 window would produce a 4 filter bank that could only discriminate between 4 angular values, but the resulting Velocity Orientation Map computation would be performed one or more orders of magnitude faster.

It should be further understood that, while sensors in a system that correctly applies the methods described in this invention, should produce cuboid pixels in such a manner that these cuboids are adjacent to their nearest neighbors in all dimensions—this is necessary for the resulting tessellation to be compact, with no void volumes, near its sensor origin—the method does not require these cuboids to be generated synchronously at a constant rate (synchronous cuboid generation at constant rate, illustrated in tessellations 360 and 370 in FIG. 3B, has been a simplifying assumption in most of our descriptions). For example, in some valid embodiments, adjacent pixels may integrate over slightly shifted time windows in an effort to mediate the possible effect of pixel refresh time. In some RIC embodiments, each pixel integrates over exposure time periods that constantly vary over time.

FIG. 16 is an illustration of another embodiment of a compound eye system 1604 mounted to a vehicle 1602 to provide navigational control via remanent imaging control in accordance with exemplary embodiments of the present invention. The embodiment shown also comprises an onboard computer 1700 coupled to sensor board 1701.

FIG. 17 illustrates in detail the components of the compound eye system 1604. The system 1604 comprises the optical components 1702, 1703, 1704, 1705, 1708, and 1709, coupled to sensor board 1701, and the motion processing computer 1700. The motion processing computer 1700 is housed, for example, under the hood of the vehicle 1602. The motion processing computer 1700 receives an image stream from the sensor board 1701 via a wired (e.g., USB as shown) or wireless connection (not shown). In some embodiment, the stream may have been preprocessed by the sensor board 1701. The motion processing computer 1700 is responsible for running the rest of the remanent Imaging code (e.g. RIC 103 components) and control equipment accordingly. In some embodiments, the compound eye system 1604 may be used as a collision avoidance assistant and may send commands to alert the driver or bring the vehicle 1602 to a halt.

In other embodiments, similar capabilities could be implemented using camera positioned at different places around the car. In yet other embodiments, pre-existing cameras, already mounted on a car, could be retrofitted, and, with or without the addition of new cameras, used to implement a Remanent Imaging Control system.

FIG. 17 is a detailed illustration of the compound eye system 1604 shown in FIG. 16 in accordance with exemplary embodiments of the present invention.

Because Remanent Imaging is robust with respect to focus and image noise, the RIC 103 relaxes focus requirements on optical components. This allows using new types of image forming devices in which images are formed by combining contributions from different image collecting devices.

For example, some embodiments may use fiber optics image guides as image forming devices. FIG. 17 is a schematic view of a fish eye type, image guide based Remanent Imaging Control system for vehicle navigation applications. Sensor board 1701 receives images, via fiber bundle based image guide 1705, which form on the sensor chip surface via adapter 1709. The part of the light guide that is designed to protrude out of the vehicle is protected by a semi rigid antenna-like enclosure 1702 that also houses the image forming optical components. These components are held in place in a transparent spherical enclosure 1708 which may be made of molded acrylic. The components consist of a collimating lens 1703, focused to infinity, and a reflective lens 1704. Both lenses may be made of molded acrylic and lens 1704 may be coated with a reflective layer. The surface of lens 1704 is symmetrical around the principal axis of the collimating lens 1703. The shape of lens 1703 may be spherical, conical, or any other shape dictated by the desired field of view.

Images collected by such assembly are recorded in Remanent Imaging mode and pre-processed by the sensor board 1701, then transmitted to motion processing computer 1700 (which implements remanent imaging control methods described herein) which performs the balance of the processing and issue commands to the equipment(s) to be controlled (e.g., vehicle 1602 in FIG. 16).

Other image forming designs can be used to collect panoramic imagery. While the design in FIG. 17 is reminiscent of a compound eye, distributed eyes, reminiscent of snail or spider eyes, can be designed. For example, the fiber bundle 1603 can be split into sections, each pointed and focused in a different direction so as to provide a panoramic coverage, or cover a specific solid angle of interest.

In other embodiments, four separate cameras could be placed at each corner of the vehicle 1602, covering overlapping domains. In such a setup, images would no longer be consolidated optically, but digitally after capture.

The kineseoscope described later can be used to fine-tune distributed eye assemblies to be used by the RIC 103. Images collected by such systems may seem, to a human observer, of a lower quality than is typical in standard imagery applications, and judging their adequacy for Remanent Imaging treatment may seem difficult. The kineseoscope is a helpful tool as it enables inspecting the imagery used by the control system downstream in the processing cycle, and, in particular, enables re-projecting and rotating images in area-time space so that their computational usability becomes easier to assess.

Smart phones offer many opportunities to implement Remanent Imaging Control. New smart phones could be designed to provide native Remanent Imaging Control support. This could be achieved with single camera systems, or by dual camera systems using assemblies modeled along the example of the dual camera assembly shown in FIG. 20.

Smart phones can also be used in a vast area of applications in which the Remanent Image stream generated by its camera (provided the camera has the capability) is processed on the phone directly using code run on the smart phone operating system.

For example, an embodiment may consist of a smart phone providing a driver alert capability of the type discussed above. FIG. 18 is an illustration of a system for preserving vehicle and passenger safety in accordance with exemplary embodiments of the present invention. In some embodiments, the smart phone is programmed to ring when an abnormal pattern is detected. For example, the phone detects whether the car is moving out of the road as a result of the driver falling asleep. In other embodiments, a smart phone 1802 is placed in the rear of vehicle to monitor incoming traffic and detect danger. In other embodiments, several intercommunicating smart phones could be used, or a single smart phone can be used to accomplish some or all of the tasks required. In some instances, each phone has a built in RIC 103, or communicates data back and forth between a remote RIC 103 via a network 110.

Figure 19:
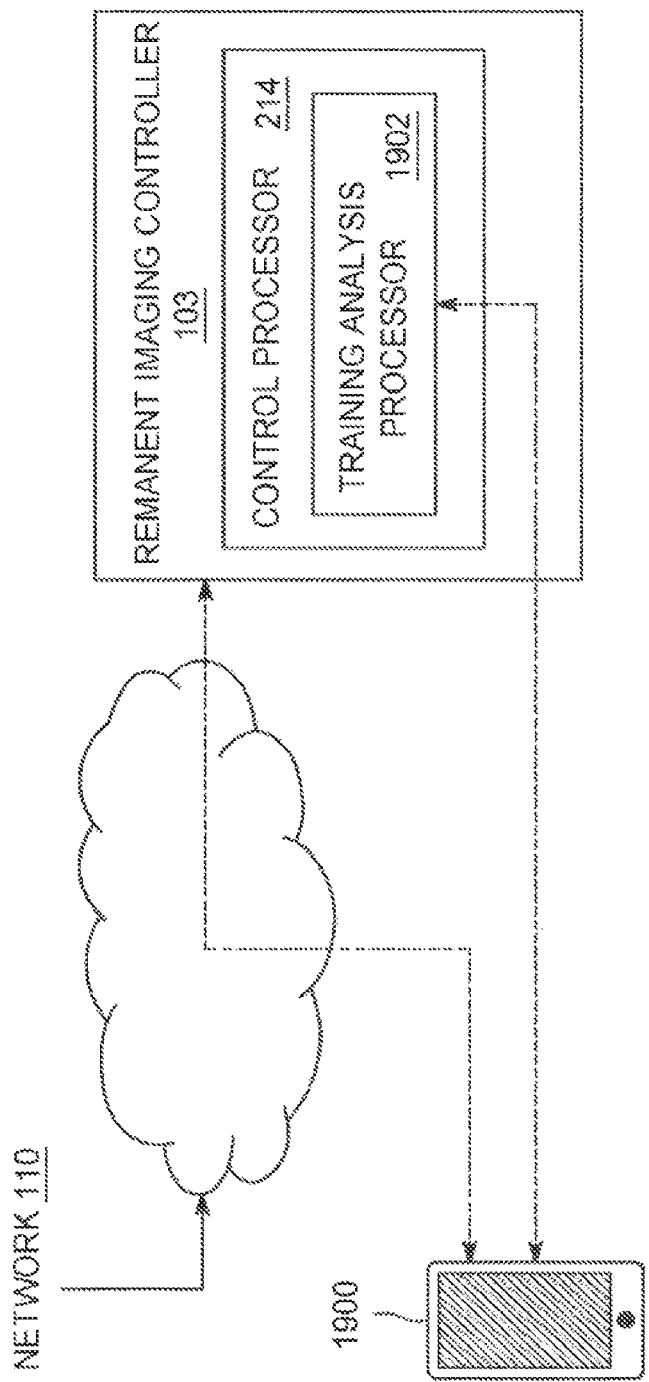
FIG. 19 is an illustration of a smartphone system for sports training analysis in accordance with exemplary embodiments of the present invention.

FIG. 19 is an illustration of a smartphone system for sports training analysis in accordance with exemplary embodiments of the present invention.

For example, a remanent image control application such as training analysis processor 1902 is installed on mobile device 1900 and aids golf practitioners improve their swing by recording their swings and provide feedback and swing performance measures. The smart phone is positioned, in some embodiments, on a caddy so that its field of view covers the area where the player practices. The smart phone camera, preset to record in Remanent Imaging mode, could be started manually or by vocal commands. Captured images are processed as soon as available. If colored balls are used—yellow is a common color for practice balls—, colored images may be preferred. Otherwise, and depending on the smart phone camera programmability, gray level or raw images may be preferred. The golfer may control the application via a graphical user interface. In particular, the golfer can examine processing results presented via overlays on the actual recording of the golf swing sequence. In one embodiment, the mobile device 1900 communicates with the RIC 103 via a network 110, while in other instances the RIC 103 is contained on the mobile device 1900.

Figure 20:
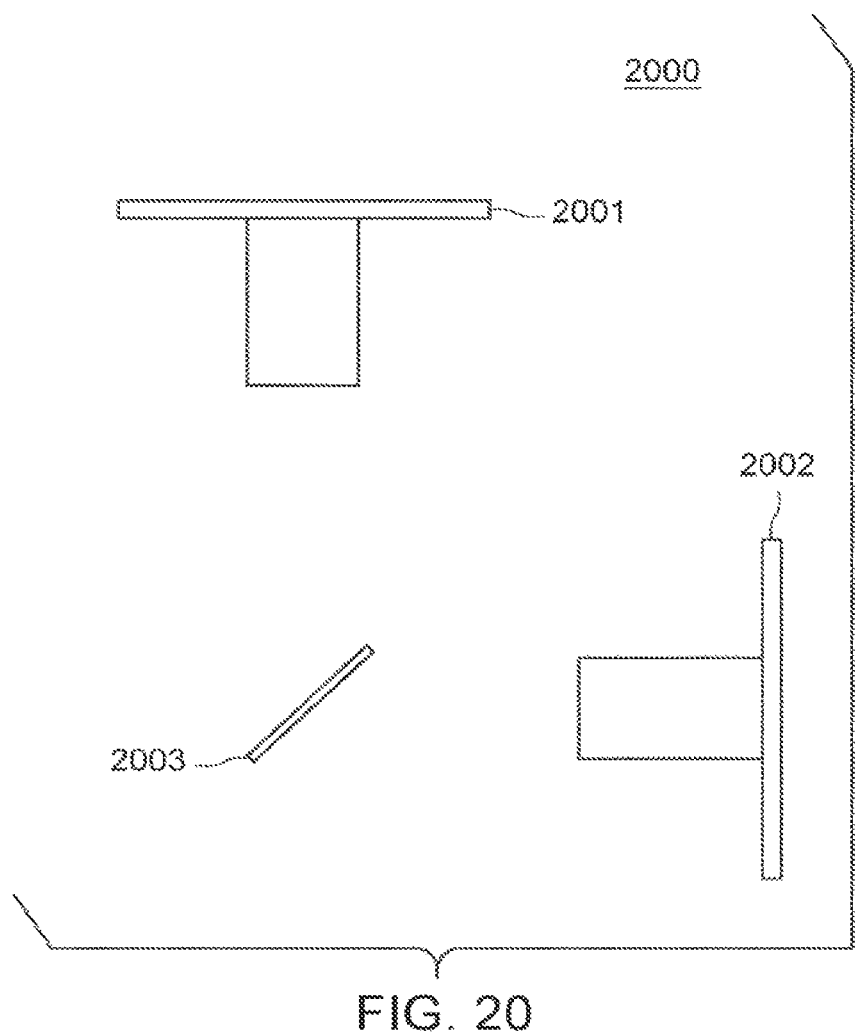
FIG. 20 is an illustration of a kineseoscope in accordance with exemplary embodiments of the present invention.

FIG. 20 is an illustration of a kineseoscope in accordance with exemplary embodiments of the present invention.

A number of observation instruments have been invented to provide a human observer details on an otherwise difficult to examine object by using planar images; for example, a telescope can be used to see a distant planet, a microscope to see plant or animal cells, or a radioscope to see organs in a living patient. All these modalities have in common that they reduce the dimensions of the observed object to fit the constraint of a planar image. When time is one of the dimensions to be reduced, the prior art modalities will operate this reduction via sampling over time and generation of sequences of images.

Figure 22:
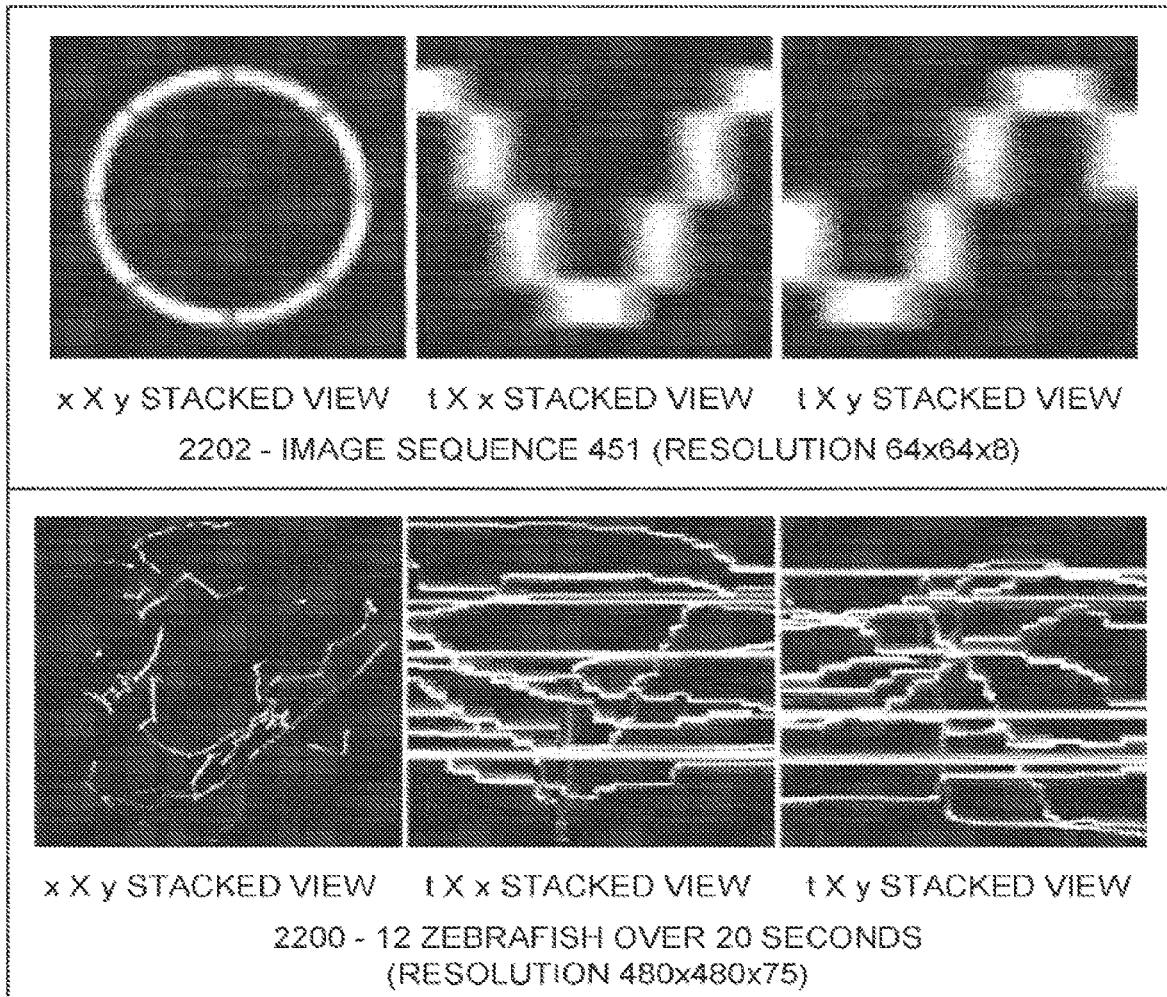
FIG. 22 is an illustration of the kineseoscope's three-dimensional kinematic data visualization capabilities.

FIG. 20 illustrates a camera assembly that can be used in a dual camera "kineseoscope" 2000 which is a new type of observation instrument which represents a stream 200 in terms of the cuboid tessellation formalism discussed earlier. The kineseoscope 2000 is radically different from prior art instruments in that it treats the time and spatial dimensions present in Remanent Images in essentially the same way. A kineseoscope consists in one or several capture devices recording the same scene, associated processing hardware such as RIC 103 (this hardware can be embedded in the capture device or can be provided by an external board, a PC or as a service across network 110), and software algorithms to extract and store measures and generate views to be displayed to the user. In multiple-camera configurations, at least one camera is required to record in Remanent Imaging mode. The user can view and manipulate image data in 3 spatio-temporal dimensions. FIG. 22 provides illustrations by showing images sequences projected along each of the three spatio temporal planes; item 2202 shows the sequence 451 capturing the brilliant point at 64×64×8 resolution stacked along the time dimension (x×y stacked view), the y dimension (t×x stacked view), and the x dimension (t×y stacked view). Item 2200 shows the example of a 20 second, 3.75 fps remanent imaging recording of 12 zebrafish (480× 480×75 resolution using the conventions discussed earlier), stacked along the same dimensions as item 2202. This ability to rotate the image stream along these 3 dimensions provides unique insights into the dynamic data. Using a kineseoscope with a dual camera capture device as in FIG. 20 provides further investigation possibilities.

In this instance, a simplified dual capture device system is presented. Two identical capture devices 2001 and 2003 are set in a fixed assembly with their optical axes orthogonal to each other. In some embodiments, these cameras may be "The Imaging Source's USB board-level cameras DMK 21AU04" equipped with M12×0.5 board lenses. The lenses are focused identically on the scene to be measured. The optical path of both cameras goes through and is split by the beam splitter 2003. Each path is split in two branches, with only one of the two branches carrying light information pertaining to the scene while the other ends in a light sink. The optical properties of the beam splitter determine the amount of light each camera receive, and therefore will set constraint on their respective light gathering parameters, namely exposure time, iris opening it the cameras are so equipped, and gain.

In some embodiments, the beam splitter 2003 may be provided by a 24 mm×50 mm glass cover slide cover-slip positioned perpendicularly to both camera optical paths, as depicted on FIG. 20. In such situation, as a result of glass's optical properties, camera 2002 would receive approximately one tenth of the amount of light received by camera 2001.

The camera configuration in FIG. 20 can be made using tubes fitting the lenses of board-level cameras to build a fixed focus kineseoscope. An assembly of two same diameters tubes bounded at 90 degree angle along a mitered end can be used to (1) secure both cameras at the proper position, (2) secure proper focus by preventing the lenses from accidentally rotating, (3) hold beam splitter 2003 at the proper position, and (4) act as a light sink for the path branches that do not intersect the scene. A hole circular in planar projection can be cut in the tube assembly to permit light from the scene to reach the cameras. Other assemblies are possible.

Another embodiment involves operating the cameras at their maximum supported frame rate and using one camera to sample data that would be captured in Remanent Imaging at a still higher frame rate if that higher frame rate was supported by the camera. This is equivalent to capturing in Remanent Imaging mode with one camera and in Snapshot Imaging mode with the other. This embodiment applies when the scene not only involves object motion but also object deformation.

Such a dual camera configuration can be used to achieve different goals. One goal might to measure the test the validity of the "sensor instant refresh" assumptions by setting camera 2001 frame rate at a fraction of that of camera 2002 and comparing images synthesized from sequences captured by camera 2001 to images captured by camera 2002. Such a test would require cameras with triggering capabilities so that the timing capture of both cameras can be synchronized. Also, and unless the camera lenses have a tunable iris, the optical property of beam splitter 2003 would constrain practical frequency ratios. For example, in embodiments using a glass slip, the frame rates should be in a $\frac{1}{10}$ or $\frac{1}{8}$ ratio.

A variation of the Processing Before Recording capability, which leverage the tight control of the capture device in the paradigm introduced in the present invention, enables a family of capabilities named "Remanent-Adaptive" capabilities, meaning that the image capture parameters can be constantly and automatically tuned during the recording process to achieve a particular goal, and that the controlling process itself is constantly tuned as a result. Six such capabilities are discussed: Remanent-Adaptive tracking, Remanent-Adaptive region of interest (ROI) extraction, Remanent-Adaptive exposure, Remanent-Adaptive focus, Remanent-Adaptive spatial resolution, and Remanent-Adaptive image compression.

These capabilities aim at improving performance, image quality, or data bandwidth efficiency in situations in which not all the visual information captured in images is of equal interest all the time. For example, some embodiments may be used to monitor a laboratory animal, such as a zebrafish larva, for instances of a particular transient behavior, such as a stereotypical movement. Image details would generally be unimportant and even undesirable, except during the short duration during which the behavior of interest occurs. Some other embodiments may be used to track various moving objects, and performance goals may require trade-offs to be constantly reassessed as the scene and the object movement change over time.

In general, these capabilities relate to the cuboid tessellations discussed earlier in that they offer ways to vary the tessellation's resolution in different regions of the area-time volume covered by the tessellation in order to capture the area-time volumes of interest at the highest possible spatio-temporal resolution and the unimportant information at the lowest possible resolution.

Figure 21:
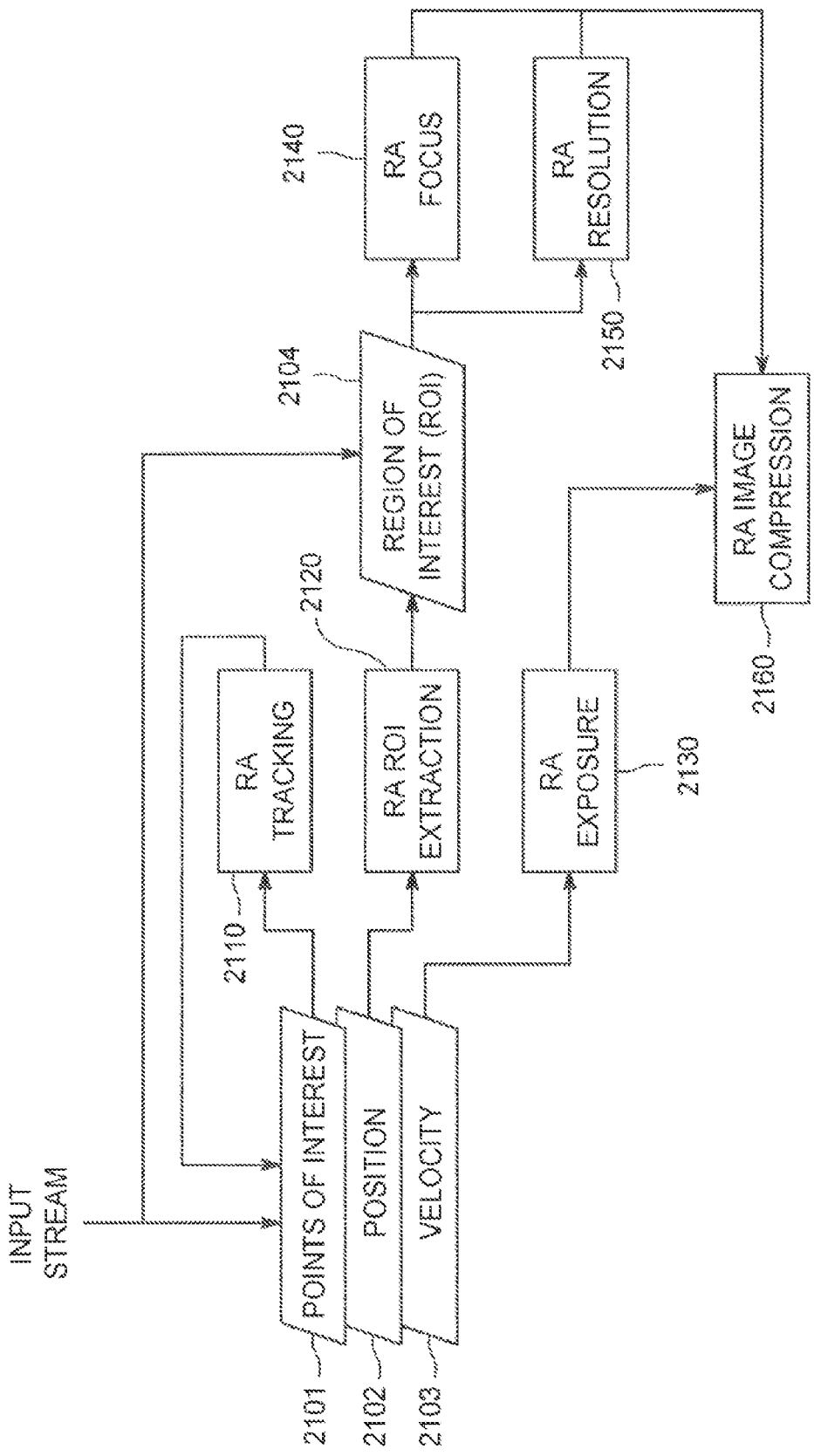
FIG. 21 is a method diagram for remanent adaptive capabilities in accordance with exemplary embodiments of the present invention.

FIG. 21 is a diagrammatic view showing how these capabilities relate to each other and to their input logically. It should be understood that the figure itself does not map directly to the RIC process flow, such as represented in FIG. 3; instead, it describes in generic terms functions that may be implemented by specific embodiments, and it is these functions that can be described by remanent imaging control process flow. Therefore, the input stream 2105 refers generically to a combination of input streams to the various processes shown in FIG. 3A.

Objects and areas of interest in images can generally be specified using points (data 2101) or image regions (data 2104), which can be specified in the input stream specifically or computed from previous value. Points of interest can be maintained using their position (data 2102) and, possibly, velocity (2103), data that can be consumed by processing block 2110 to perform Remanent-Adaptive tracking. Points of interest position 1002 can be used to infer ROIs (data 2104) via processing block 2120. Computation of points of interest velocity is used to perform Remanent-Adaptive exposure 2130. In turn, an ROI 2104 is required to perform Remanent-Adaptive focus and Remanent-Adaptive resolution. Finally, Remanent-Adaptive image compression may by implemented using a combination of Remanent Imaging exposure, focus, and/or spatial resolution capabilities.

Remanent-Adaptive Tracking

Remanent-Adaptive tracking aims at adjusting recording and processing parameters in real time so that specific tracking related tasks can be performed in near optimal conditions, that is, match performance criteria which may be expressed as absolute goals or trade-offs between accuracy, real time performance, and processing and communication bandwidth.

Remanent Imaging provides different options for implementing efficient multi-tracking algorithms. In some situations, a scene content and illumination may be such that multi-tracking can be performed directly from Motion Maps in real time by simply connecting trajectory segments from frame to frame. In other situations, Motion Maps may contain much extraneous information—for example non trajectory line segments generated by immobile object contours or contrast areas—which need to be removed so that trajectories can be fully determined; in some embodiments, optimization and graph traversal algorithm can be used efficiently for that purpose. In yet other situations, classical predictive multi-tracking algorithms may be adapted to the context of Remanent Imaging and provide efficient implementations.

In general, the various possible multi-tracking implementations typically differ in the accuracy/performance trade-offs they allow; some will produce highly accurate results at high computational costs, while others may be very computational efficient but produce tracking errors. The RIC 103, by allowing the concurrent processing of image streams at different time resolutions, allows several concurrent multi-tracking processing chains to be performed in parallel, each working on images at different time resolution. For example, fast tracking algorithm may be used at the nominal frame rate, yielding occasional errors, while higher accuracy algorithms run in parallel at a fraction of that frame rate on Remanent Images Stacks to identify potential tracking errors. In turn, monitoring the error occurrence rate allows the RIC 103 to adjust the various processing frequencies to their optimal values.

Remanent-Adaptive Image Compression

Remanent-Adaptive capabilities may be implemented by combining other Remanent-Adaptive capabilities to meet a set data bandwidth requirement. For example, such capability may be found in camera systems embodiments used to record sporting events at very high resolution (for example 4 k2 k) and frame rate (for example 1,000 fps) so that critical moments can be replayed in slow motion with crisp images while outputting a stream of data sustainable given the available network bandwidth In such embodiments, the capability can typically be implemented by the following process. Two frame rates are selected before the recording starts: the desired maximum frame rate and the baseline frame rate. The desired maximum frame rate is selected on the basis of the dynamics of the fastest events to be expected and the desired slow down replay rate; the baseline frame rate is typically that of the broadcast context, for example, 60 fps. To produce a desired level of background blur, a background blur factor may also be specified as an integer divisor of the baseline frame rate. To assemble Stacked Images, the pre-processing block manages a local ring buffer cache, called the "Remanent Layer", as close to the recording hardware as is allowed by the camera architecture. It is assumed that a communication protocol is available to support the concurrent transmission of image data at two different frame rates (maximum frame rate for action-critical full resolution ROI data and baseline frame rate for background image data) in such a way that image data can be reassembled at the receiving end for display or storage purposes.

The camera is operated at the desired maximum frame rate using the Remanent Exposure at that frame rate. After capture, each frame is processed by the Motion Mapping block to produce a Motion Map. Based on the Motion Map, additional processing to determine whether any worthwhile events are happening on the frame. Depending on the circumstances, events of interest may be characterized by monitoring dynamics criteria of points or regions of interests: Remanent-Adaptive tracking of points of interest or Remanent-Adaptive ROI extraction is implemented accordingly, higher order Motion Maps are computed in neighborhoods of tracked points or regions or interests, and subsequent filtering and pattern matching is perform to assess whether dynamics criteria are met. In some embodiment, such pattern can be implemented via machine learning-derived algorithms.

When events or interest are identified, the corresponding ROI can be streamed at full resolution, possibly after some additional processing is performed; in some embodiments for example, the motion of the tracking camera may be corrected. Concurrently to this streaming, a mask of the image can be updated to exclude already streamed regions of interest, then applied to the image before stacking in the Remanent Layer. Finally, if the counter for the current frame is a multiple of the baseline frame rate, the content of the Remanent Layer is streamed out of the camera. If a background blur factor was specified, the Remanent Layer ring buffer is shifted accordingly in preparation for the next sequence, so that a consistent minimum level of blur is maintain across images.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in a functional programming language, such as Haskell, Lisp, or JavaScript, and/or an object oriented programming language, such as Java.®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), Field-Programmable Gate Arrays (FPGAs), or programmed Digital Signal Processors, or microcontrollers.

The invention claimed is:

1. A non-transitory computer readable medium comprising instructions for performing a method, the instructions being executable by at least one processor, the method comprising:
receiving at least one sequence of digital images from an image acquisition device, the sequence of digital images including at least one digital image, the at least one digital image resulting from a photographic exposure of a scene over a duration of exposure time, the scene including at least one motile object or medium within a field of view of the acquisition device, the at least one motile object or medium creating a motion blur within the photographic exposure when moving during the exposure time of the at least one digital image;
determining if there is a motion blur in a particular image, the particular image being based on one or more of the one sequence of digital images;
if there is the motion blur in the particular image:
analysing the motion blur created by the at least one motile object or medium within the field of view by measuring spatial changes in pixel values based on the at least one digital image to generate motion parameters; and
providing a first feedback signal based on the motion parameters to at least one controller to generate first control commands having sensitivity to movement of the at least one motile object or medium that varies in accordance with movement of the at least one motile object or medium; and
if there is an absence of the motion blur in the particular image, providing a second feedback signal to the at least one controller to generate second control commands.

2. The non-transitory computer readable medium of claim 1, the method further comprising determining one or more trajectories of points in the at least one motile object or medium based on the spatial changes in pixel values, wherein providing the first feedback signal based on the motion parameters comprises providing the first feedback signal based on the one or more trajectories of points.

3. The non-transitory computer readable medium of claim 2, the method further comprising determining one or more velocities, each associated with a different trajectory of the one or more trajectories of points based on the spatial changes in pixel values to identify motion parameters of the at least one motile object or medium, wherein providing the first feedback signal based on the motion parameters comprises providing the first feedback signal based on one or more velocities.

4. The non-transitory computer readable medium of claim 3, wherein each velocity of the one or more velocities include an angular value of at least one motile object or medium.

5. The non-transitory computer readable medium of claim 2, wherein determining the one or more trajectories of points in the at least one motile object or medium based on the spatial changes in pixel values comprises generating a synthetic image containing the trajectories of points in the at least one motile object or medium.

6. The non-transitory computer readable medium of claim 5, wherein the synthetic image is generated from stacking at least two digital images of the at least one sequence of digital images, wherein the synthetic image is a three-dimensional matrix.

7. The non-transitory computer readable medium of claim 6, wherein each of the at least two digital images have different exposure time from each other.

8. The non-transitory computer readable medium of claim 6, wherein a matrix element at position (l, j, k) represent energy accumulated by a pixel at position (l, j) during a kth time exposure.

9. The non-transitory computer readable medium of claim 2, wherein determining the one or more trajectories of points in the at least one motile object or medium based on the spatial changes in pixel values comprises generating a motion map based on pixels within the at least one digital image, the pixels having at least two adjacent lower gray-level valued neighbours opposite each other.

10. The non-transitory computer readable medium of claim 1, wherein the sequence of images were captured at 3.75 frames per second.

11. A method comprising:
receiving at least one sequence of digital images from an image acquisition device, the sequence of digital images including at least one digital image, the at least one digital image resulting from a photographic exposure of a scene over a duration of exposure time, the scene including at least one motile object or medium within a field of view of the acquisition device, the at least one motile object or medium creating a motion blur within the photographic exposure when moving during the exposure time of the at least one digital image;
determining if there is a motion blur in a particular image, the particular image being based on one or more of the one sequence of digital images;
if there is the motion blur in the particular image:
analysing the motion blur created by the at least one motile object or medium within the field of view by measuring spatial changes in pixel values based on the at least one digital image to generate motion parameters; and
providing a first feedback signal based on the motion parameters to at least one controller to generate first control commands having sensitivity to movement of the at least one motile object or medium that varies in accordance with movement of the at least one motile object or medium; and
if there is an absence of the motion blur in the particular image, providing a second feedback signal to the at least one controller to generate second control commands.

12. The method of claim 11, the method further comprising determining one or more trajectories of points in the at least one motile object or medium based on the spatial changes in pixel values, wherein providing the first feedback signal based on the motion parameters comprises providing the first feedback signal based on the one or more trajectories of points.

13. The method of claim 12, the method further comprising determining one or more velocities, each associated with a different trajectory of the one or more trajectories of points based on the spatial changes in pixel values to identify motion parameters of the at least one motile object or medium, wherein providing the first feedback signal based on the motion parameters comprises providing the first feedback signal based on one or more velocities.

14. The method of claim 13, wherein each velocity of the one or more velocities include an angular value of at least one motile object or medium.

15. The method of claim 12, wherein determining the one or more trajectories of points in the at least one motile object or medium based on the spatial changes in pixel values comprises generating a synthetic image containing the trajectories of points in the at least one motile object or medium.

16. The method of claim 15, wherein the synthetic image is generated from stacking at least two digital images of the at least one sequence of digital images, wherein the synthetic image is a three-dimensional matrix.

17. The method of claim 16, wherein each of the at least two digital images have different exposure time from each other.

18. The method of claim 16, wherein a matrix element at position (l, j, k) represent energy accumulated by a pixel at position (l, j) during a kth time exposure.

19. The method of claim 12, wherein determining the one or more trajectories of points in the at least one motile object or medium based on the spatial changes in pixel values comprises generating a motion map based on pixels within the at least one digital image, the pixels having at least two adjacent lower gray-level valued neighbours opposite each other.

20. A system comprising:
one or more processors; and
memory containing instructions that are executable by the one or more processors to configure the one or more processors to:
  receive at least one sequence of digital images from an image acquisition device, the sequence of digital images including at least one digital image, the at least one digital image resulting from a photographic exposure of a scene over a duration of exposure time, the scene including at least one motile object or medium within a field of view of the acquisition device, the at least one motile object or medium creating a motion blur within the photographic exposure when moving during the exposure time of the at least one digital image;
  determine if there is a motion blur in a particular image, the particular image being based on one or more of the one sequence of digital images;
  if there is the motion blur in the particular image:
    analyse the motion blur created by the at least one motile object or medium within the field of view by measuring spatial changes in pixel values based on the at least one digital image to generate motion parameters; and
    provide a first feedback signal based on the motion parameters to at least one controller to generate first control commands having sensitivity to movement of the at least one motile object or medium that varies in accordance with movement of the at least one motile object or medium; and
  if there is an absence of the motion blur in the particular image, providing a second feedback signal to the at least one controller to generate second control commands.

* * * * *